United States Patent [19] | [11] Patent Number: 4,860,785
Sundstrom, Jr. | [45] Date of Patent: Aug. 29, 1989

[54] EMERGENCY FUEL TRANSFER ACCESSORY

[76] Inventor: Lowell W. Sundstrom, Jr., 9094 N. Hwy. 40, #17, Lake Point, Utah 84074

[21] Appl. No.: 200,631

[22] Filed: May 31, 1988

Related U.S. Application Data

[63] Continuation of Ser. No. 940,394, Dec. 11, 1986.

[51] Int. Cl.⁴ ............................................ A01M 7/00

[52] U.S. Cl. ............................ 137/351; 137/255; 137/563; 137/565

[58] Field of Search ............... 137/351, 255, 563, 565, 137/625.41; 180/314

[56] References Cited

U.S. PATENT DOCUMENTS

| | | | |
|---|---|---|---|
| 1,329,997 | 2/1920 | Page | 137/255 |
| 2,414,451 | 1/1947 | Christensen | 137/255 |
| 3,677,284 | 7/1972 | Mendez | 137/351 |
| 4,286,624 | 9/1981 | Clausen et al. | 180/314 |
| 4,287,908 | 9/1981 | Stongard | 137/563 |
| 4,386,625 | 6/1983 | Perkins et al. | 137/255 |

*Primary Examiner*—A. Michael Chambers
*Attorney, Agent, or Firm*—Trask, Britt & Rossa

[57] ABSTRACT

An emergency fuel transfer accessory adapted for mounting in a vehicle's fuel system is disclosed. In a normal or first mode the accessory directs fuel through the confidential fuel system of the vehicles. The accessory includes a valve adapted for utilizing the action of the vehicle's fuel pump for drawing fuel from an external fuel source and directing that fuel through the fuel system of the accessory fitted vehicle into said vehicles fuel tank. The valve is further adapted in another mode to transfer fuel from the accessory fitted vehicle outward to an external fuel source. In a fourth mode, the valve is adapted to direct fuel from a first external fuel source, through the accessory fitted vehicle's fuel system, and thereafter discharging that fuel into a second external fuel source. The valve includes a plurality of channels which are positionable to connect with conduits connecting the accessory vehicle's fuel pump, fuel tank and carburetor. Additional conduits are connectable with the external fuel source.

3 Claims, 13 Drawing Sheets

EMERGENCY FUEL TRANSFER ACCESSORY

This is a continuation application of Application Ser. No. 940,394 issued May 31, 1988 as U.S. Pat. No. 4,747,429.

BACKGROUND OF THE INVENTION

1. Field

This invention is directed to an accessory for engines, especially vehicle engines. More specifically, the invention is directed to a device for pumping fuel from the fuel tank of a one engine into the fuel tank of another engine.

2. State of the Art

The problems which arise when a vehicle exhausts its fuel supply en route are well known. Assuming that the distressed driver is able to petition a passing motorist to stop and render assistance, the complications arising from transferring fuel from the fuel tank of the second vehicle into the tank of the first vehicle are many.

The most common approach is to use a siphon to transfer the fuel from one fuel tank into the other. The structure of these siphons may vary considerably. The most basic construction includes generally a flexible pipe upon which the user induces a vacuum on one end of the pipe while the opposing end is positioned in the fuel of the fuel contaning tank. Typically, the user induces this vacuum by sucking on the free end of the pipe. Observably, this method involves the risk that the user may inhale or ingest fuel upon attempting to induce fuel from the tank into the pipe.

A second method involves the use of a so-called "siphon pump." Siphon pumps generally include a pipe or conduit which is flexible. The pipe is fitted with a hand-operated pump, which induces fuel from one tank through the pipe to the second fuel tank.

Both of the above-described methods require that the user carry either a pipe or siphon pump. Neither method includes a device which is typically connected to the vehicle. Further, both methods require the user to manipulate the device.

For example, in the first method, the user must actually inhale or induce a partial vacuum on one end of a pipe which is fitted down into a gas tank. In the second system or method, the user must activate and manipulate a hand pump in order to induce fuel from a first reservoir through the conduit and into a second reservoir. Due to the fact that both these methods require equipment which is not linked or connected to the vehicle itself, often times these devices are either misplaced or lost.

The situations wherein these devices are needed often occur unpredictably. As a result, the user may find himself in a embarrassing, if not inconvenient, situation if he is unable to locate the device at the time required.

If the user is unable to locate one of the abovedescribed devices there is little opportunity or means of conveying gasoline from a self-contained fuel tank positioned beneath the structure of one automobile into a similarly situated tank in another vehicle. Given the inconvenience, and, to some degree, danger which may accrue to a motorist stranded on a highway and unable to start his vehicle due to lack of fuel, it is therefore an important consideration to provide apparatus which is adapted to readily transfer fuel from one vehicle into another.

In U.S. Patent 4,064,901 (Bailey), an accessory device which is attachable to a vehicle for pumping fuel from the vehicle into the fuel tank of a second vehicle is disclosed. The Bailey device includes a flexible hose which is connected between the fuel pump and the carburetor of the first vehicle. Positioned in that hose is a valve. The valve is constructed to permit a flow of fuel, induced by the fuel pump, both through the conduit leading to the carburetor as well as to a second hose of sufficient length to be extended to the fuel tank of a second vehicle.

In the Bailey construction, a generally T-shaped fitting may be mounted within a first hose leading from the fuel pump to the carburetor. A second hose is fitted on one leg of the Tee connection. A valve cock is mounted on the free end of the second hose to control a flow of fuel through that hose from the first hose. Stated in other terms, the second Bailey construction involves filling the internal channel of the second hose with fuel throughout the operation of the engine. The discharge of that fuel is controlled by a valve mounted on the free end of the second hose.

The Bailey device is adapted solely for channeling fuel from the gas tank of the device fitted vehicle outwardly to the gas tank of a second vehicle or other fuel system. The Bailey device does not appear to be adapted for drawing fuel from an external fuel source and directing that fuel to the Bailey fitted vehicles's fuel tank. Furthermore, the Bailey device does not appear to be directed to a system whereby fuel from a second vehicle, which does not have a fuel transfer accessory, may be transferred to a third vehicle which has exhausted its fuel supply.

There exists therefore a need for a multi-use fuel supply accessory device. This device should be adapted for accessing the fuel tank of a second vehicle and transferring a sufficient supply of fuel from that second vehicle into a first vehicle permitting the continued operation of the first vehicle. This auxiliary device should also be constructed to permit the reverse operation, i.e., the transfer of fuel from the accessory-fitted first vehicle into a fuel tank or system of a second vehicle or second fuel container. In an optimal construction, a fuel transfer device would also be constructed to permit the transfer of fuel from a second vehicle or container to a third vehicle or container utilizing the fuel system of a first, transfer device fitted vehicle.

SUMMARY OF THE INVENTION

A multi-use valve system or fuel supply system adapted for placement within the fuel system of an engine is disclosed. The valve system is especially adapted for use with any vehicle engine or stationary engine having a fuel pump and fuel tank.

The fuel system includes a valve body casing which defines a plurality of ports. Each of the ports includes a nozzle which extends outwardly from the valve body casing. Each port communicates with a hollow interior cavity defined by the valve body casing. Positioned adjustably within the interior cavity of the valve body casing is a valve core. The valve core defines a plurality of channels therein which may be adjustably positioned in a variety of orientations with respect to the ports.

In preferred embodiments, four ports are defined within the valve body casing. Each port, with its attendant nozzle, is associated with a conduit or hose-like member. A first conduit or hose-like member is fitted to a first nozzle. The first conduit has an opposing end which is associated with the fuel tank of the fuel system of the first vehicle. This first conduit facilitates the transfer of fuel between the valve core and the fuel tank.

A second conduit has a first end which is fitted to a second port/nozzle assembly. The second end is associated with the carburetor of the first vehicle. The second conduit is constructed to permit the transfer of fuel between the valve core and the carburetor of the first vehicle.

A third conduit having a first end and a second end is mounted such that the first end is fitted on a third port/nozzle assembly positioned within the valve body, and thereby communicates with the valve core. The second end of the third conduit is associated with the fuel pump of the first vehicle. The third conduit is constructed to transfer fuel between the valve body core and the fuel pump.

A fourth conduit having a first end and a second end is mounted to have its first end fitted to a fourth port/nozzle assembly of the valve body casing. This fitting permits the fourth conduit to communicate with the core. The opposing second end of the fourth conduit is associated with an external fuel system. For example, this fourth conduit's second end is adapted to be fitted within the fuel tank of a second vehicle's fuel system. This external fuel system may also include a fuel can or other fuel reservoir. Hereafter, for purposes of clarity, the description will be directed to the fuel system of a second vehicle. It should be understood that any external fuel source may be substituted for the fuel system of the second vehicle. The invention is intended to embrace all such external fuel sources. The fourth conduit is adapted to permit the flow of fuel between the valve core and the external fuel system or supply.

The instant invention is adapted to be mounted to a conventional fuel system wherein the fuel pump provides a larger quantity of fuel to the carburetor than is actually required for operation of the engine. In other words, the instant invention is directed for placement within a fuel system wherein an excessive quantity of fuel is channeled to the carburetor. Some gas engines and most diesel engines provide a return line or hose to return the excess fuel from the carburetor to the vehicle's gas tank. To accommodate these engines, the valve body may include a fifth port and an associated nozzle.

A fifth conduit, similar in construction to the above-described conduits, is mounted to the fifth port/nozzle assembly of the valve body casing to communicate with the valve core. The fifth conduit is also connected to the fuel tank of the first vehicle. The fifth conduit is adapted to permit the transfer of fuel from the valve core to the fuel tank.

The valve body core and the channels defined therein are amde adjustable between a minimum of two distinct orientations and preferably between three orientations. In its first orientation, the valve core is adapted to interconnect the first conduit with the third conduit. In those constructions having a fifth port, the valve core also associates the second conduit with the fifth conduit. In this orientation, as the fuel pump is activated and begins to apply a partial vacuum to the conduits, fuel is induced from the first vehicle's gas tank and thereafter passes through the first conduit through the valve core and into the fifth conduit which leads the fuel directly to the fuel pump. After passing through the fuel pump, the fuel is directed to the carburetor by means of a connective hose which is positioned between that fuel pump and the carburetor.

In its fifth port construction, the instant invention provides for the channeling of the excess fuel at the carburetor through the second conduit into the valve core and thereafter through the fifth conduit and back into the fuel tank of the first vehicle if it originally came equipped with a fuel overflow return line. If not, that fifth conduit port will be blocked or capped off as it has no use on some vehicles.

A second orientation of the valve core provides for the connection of the fourth conduit to the third conduit and the second conduit to the first conduit. In this orientation, a fuel conduit or passageway is defined between an external fuel supply on system, e.g. a second vehicle's fuel system, and the valve core or any other fuel supply container such as a five (5) gallon fuel can. Thereafter, the fuel is directed to the fuel pump. From the fuel pump, the fuel is channeled to the carburetor. That portion of the fuel which is not directed into the carburetor is channeled into the second conduit, through the valve core, and thereafter into the first conduit which directs the fuel into the fuel tank of the first vehicle.

The first orientation of the valve core is a standard operating mode of the device. It is a mode in which the fuel is drawn from the first vehicle's tank, channeled through the fuel system of the vehicle thereby permitting the operation of the vehicle. Any excess fuel remains as excess pressure in the lines or it is directed from the carburetor back to the fuel tank of the first vehcile if it was originally equipped with a fuel overflow return line.

The second orientation permits the user to draw fuel from an external fuel system or reservoir, e.g. the fuel tank of a second vehicle or outside fuel source, utilizing the pump action of the first vehicle's fuel pump. The valve system transfer the fuel into the first vehicle's engine to permit its operation. The fuel is transfered via the cranking of the engine and more specifically by the operation of the fuel pump. If the vehicle has an "electric fuel pump" the turning on the ignition key energizes the electric fuel pump, and thereby effects the fuel transfer. The valve system channels all excess fuel, i.e. that not injected into the engine's firing chambers, into the fuel tank of the first vehicle. This second mode of operation facilitates the operation of the first vehicle's engine while at the same time employs that operation to fill the first vehicle's fuel tank.

The second orientation of the instant invention permits the operation of the first vehicle's engine and the filling of the first vehicle's fuel tank without any reliance whatsoever upon the engine or mechanical systems of the second vehicle. Therefore, should the second vehicle or other fuel source, for one reason or the other, be disabled, the instant invention would function not withstanding that disability to transfer the fuel from the second vehicle's fuel tank into the first vehicle's fuel tank.

A third orientation of the valve core interconnects the first conduit to the third conduit and the second conduit to the fourth conduit. In this orientation, fuel is drawn from the fuel tank of the first vehicle and is then passed through the first conduit to the valve core. Thereafter, the fuel is directed through the third conduit to the fuel pump of the first vehicle. The fuel is then channeled to the carburetor. All excess quantities of fuel received at the carburetor are directed through the second conduit to the valve core and thereafter through the fourth conduit to the fuel tank of an external fuel system.

The third orientation effects a transfer of fuel from the fuel tank of the first vehicle, utilizing the fuel pump of that vehicle engine, outward to a fuel tank of a second vehicle. Further, the third orientation does not require the operation of the second vehicle or the other external container in order to effect the transfer of fuel.

In a preferred embodiment of the instant invention, a sixth port is configured within the valve body casing. The sixth part is fitted with a nozzle. A sixth conduit having two opposing ends has a proximal end mounted on the sixth nozzle. The sixth conduit has its distal end mounted to communicate with the fuel reservoir of a second external fuel system or container, e.g. a third vehicle or any other third fuel container.

The valve core may be adjustable to a fourth orientation wherein the core connects the fourth conduit to the third conduit and the second conduit to the sixth conduit. In this orientation, fuel is drawn by the action of the first vehicle's fuel pump from the fuel reservoir of a first external fuel system or source, through the fourth conduit to the valve core and thereafter through the third conduit to the fuel pump of the first vehicle. The fuel is thereafter directed through the conduit interconnecting the fuel pump with the carburetor. The excess quantity of fuel which has been directed to the carburetor is thereafter channeled through the second conduit to the valve core and thereafter through the sixth conduit to the fuel reservoir of a second external fuel system or reservoir, e.g. the fuel tank of a third vehicle or any other third fuel reservoir.

The instant invention addresses the need of supplying a distressed vehicle with fuel from an accessory fitted vehicle. The instant invention also addresses the requirement of supplying the accessory fitted vehicle from a second vehicle which is not fitted with the accessory. Further, the supplying of a third vehicle with fuel from a second vehicle, which is not fitted with the device is illustrated. The second vehicle having an adequate fuel supply for supplying the third vehicle, and an accessory device-fitted vehicle are interrelated to provide the third vehicle with an adequate fuel supply.

The instant invention also contemplates a fuel transfer system which may be controlled from a remote location, i.e., from the interior of the automobile. In preferred constructions, the invention is fitted with a plurality of valves, which may be electrically, hydraulically or pneumatically actuated. These valves serve to control the adjustment of the valve core between its four orientations.

DETAILED DESCRIPTION OF THE DRAWINGS

Figure 1:
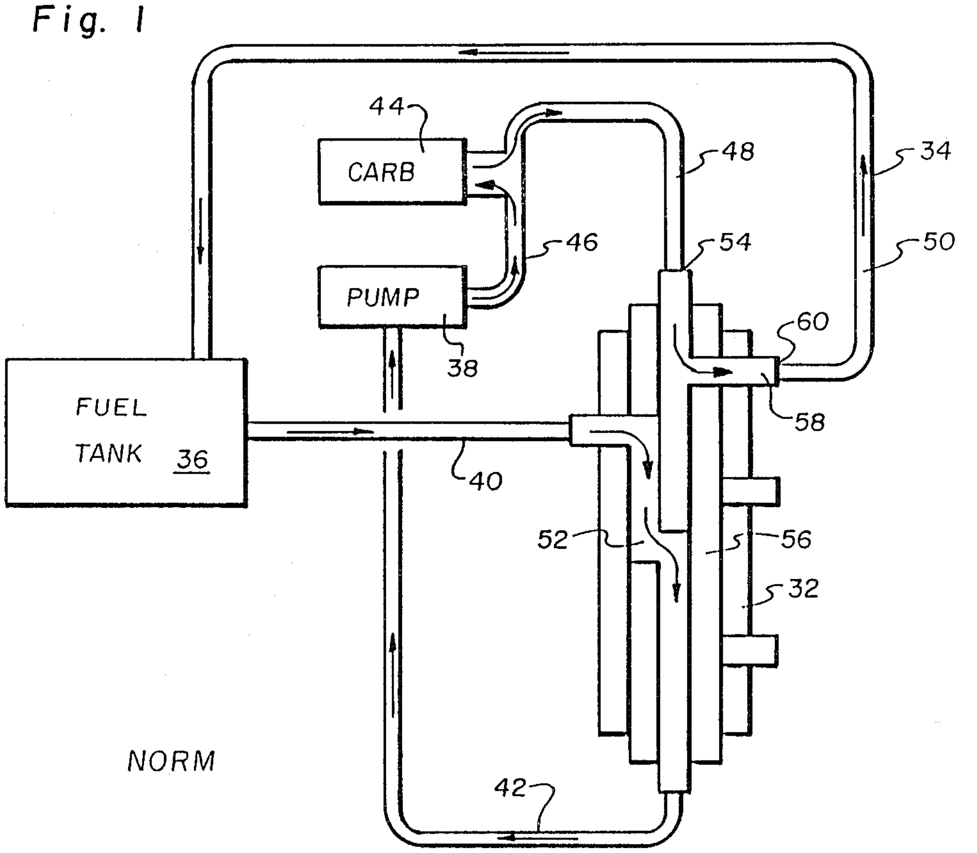
FIG. 1 is a schematic diagram of the instant invention positioned in a first or normal orientation.

As shown in FIG. 1, a fuel system accessory of the instant invention includes a valve, generally 32, which is interconnected in the fuel system, generally 34, of a vehicle. The valve connects a fuel tank of the vehicle 36 and a fuel pump 38 of the vehicle by means of a first conduit 40 which is positioned between the fuel tank 36 and the valve 32. A second conduit 42 connects the valve 32 with the fuel pump 38. The fuel pump 38 is connected to a carburetor 44 by means of a conduit 46. The carburetor 44 is connected to the valve 32 by means of a conduit 48. Valve 32 is also connected by a conduit 50 to the fuel tank 36. In general, the conduits 40, 42, 46, 48 and 50 are tubular hoses or similar pipe-like structures which individually define an interior channel throughout the length thereof. This channel is adapted to receive and transfer fuel.

The conduits are generally connected to fuel tank 36, valve 32, pump 38, and carburetor 44 through means of nozzles which are fitted within those various structures and thereby define a mounting surface for the conduit.

In the orientation shown in FIG. 1, which shall be hereinafter denominated the first orientation condition or normal condition, the valve 32 is adapted to connect the first conduit 40 with the second conduit 42. Due to the action of the pump 38 fuel may thereby be received from the fuel tank 36 through conduit 40 and thereafter be directed through a channel 52, within the valve 32. Thereafter, the fuel is channeled into the conduit 42. Conduit 42 directs the fuel into the pump 38. Pump 38 thereafter directs the fuel into conduit 46. Conduit 46 empties the fuel into carburetor 44. The pump 38 of the instant invention delivers a sufficient quantity of fuel to the carburetor 44 to exceed the requirements of that carburetor, i.e., the fuel pump 38 delivers an excess quantity of fuel to the carburetor. The excess of fuel is directed through a conduit 48 from the carburetor 44 to the valve 32 through the port 54. Upon the fuel entering port 44, it is directed through a channel 58 defined by the first orientation of the valve core 56. Conduit 58 leads to a port 60. Upon the fuel reaching port 60 if the vehicle was originally equipped with a fuel overflow system, it is channeled into a conduit 50. Conduit 50 directs or channels the excess fuel back to fuel tank 36. If the vehicle was originally not equipped with a fuel overflow system, the fuel remains stagnant in conduit 48, port 54. Port 60 in this instance is blocked or capped off.

As may be noted by a cursory review of FIG. 1, the normal or first orientation of the valve 32 effects the same fuel distribution as a conventional fuel system.

Figure 2:
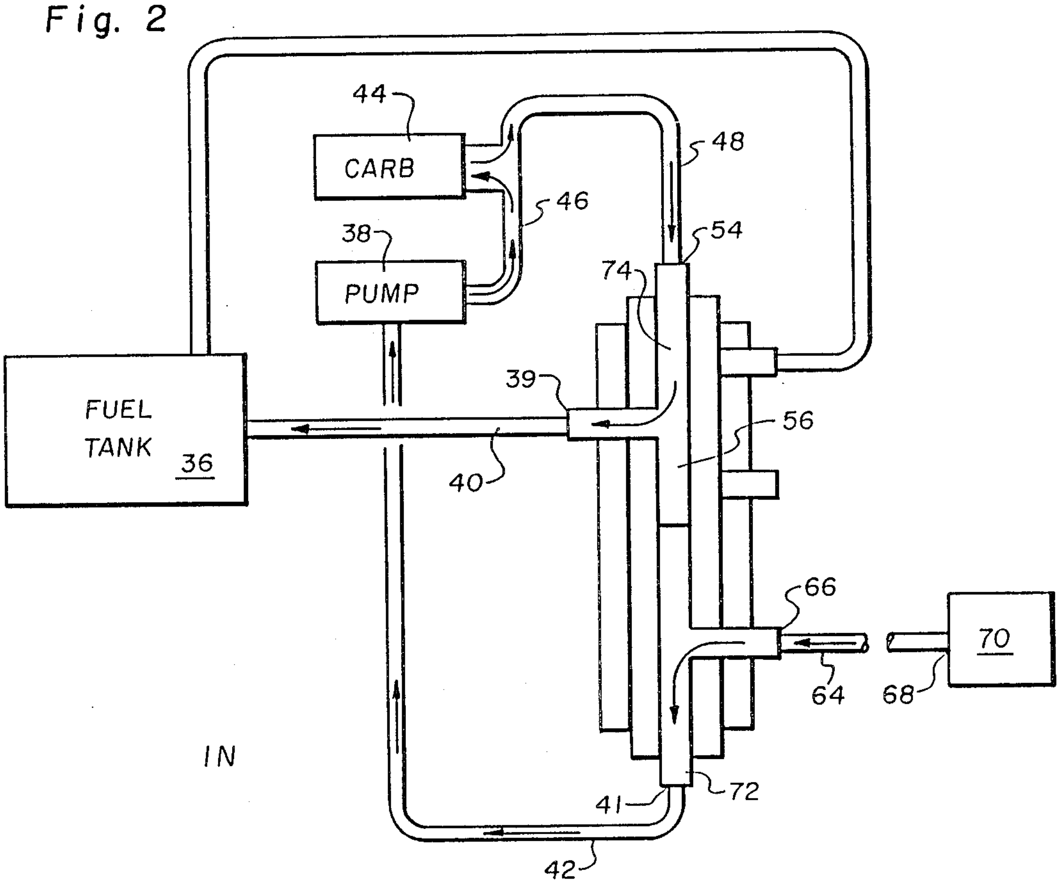
FIG. 2 is a schematic diagram of the instant invention detailing the second orientation of the instant invention.

The second orientation, shown in FIG. 2, is known as the transfer-in mode. This mode involves the use of a conduit 64, which is received within a nozzle 65 fitted in port 66 of the valve body 32. Conduit 64 is connected at its opposing end 68 with a fuel reservoir of an exterior source. This exterior source 70 may be the fuel tank of a second vehicle or any other fuel source. The valve core 56 defines an interior channel 72 which communicates with the port 66, defining a means for receiving fuel from the conduit 64 through the valve body 32. Channel 72 discharges the fuel from the valve body through port 41 into conduit 42. The fuel flows through conduit 42 eventually reaching pump 38. The pump 38 continues the flow outward through the conduit 46 into the carburetor 44. All excess fuel received at the carburetor 44 is thereafter discharged through conduit 48 which delivers the fuel to port 54 of the valve body 32.

In its second orientation, the valve core 56 defines a channel 74 adapted to receive the fuel from port 54 and direct that fuel to a port 39 configured on the exterior of the valve body 32. The port 39 is connected to conduit 40 whereby fuel delivered to port 39 is directed into the conduit 40. Conduit 40 directs that fuel into fuel tank 36.

As may be noted from reviewing FIG. 2, the second orientation, i.e., the transfer-in mode, provides for fuel to be drawn from an exterior fuel reservoir or fuel tank 70 by the action of the pump 38. The fuel so drawn is channeled to the carburetor 44 of the accessory-fitted vehicle, whereby the engine of the vehicle may be operated. All excess fuel drawn by pump 38 from the source 70 which is not used by the carburetor 44, is directed through conduit 48 and conduit 40 into valve body 32. The valve body 32 directs that fuel to fuel tank 36. The instant invention in the orientation shown in FIG. 2 provides for the continuing operation of the engine of the accessory-fitted vehicle while at the same time providing for the filling of the fuel tank of that vehicle.

Figure 3:
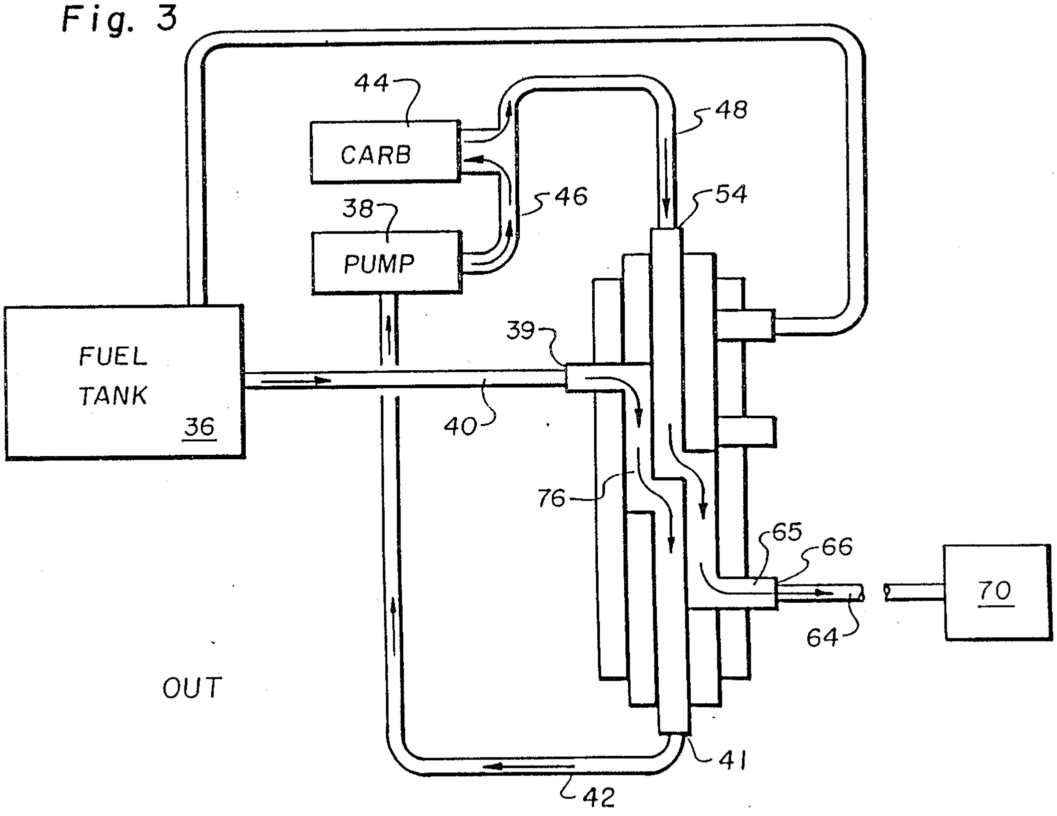
FIG. 3 is a schematic diagram of the instant invention showing the third orientation of the invention.

As shown in FIG. 3, a third orientation or condition of the instant invention may provide for the directing of fuel from the fuel tank of the first vehicle, i.e., fuel tank 36, outwardly to an external fuel reservoir, identified generally as 70. The operation of the pump 38 effects a vacuum, drawing the fuel from tank 36 outwardly, through conduit 40 and then through port 39 into the valve body 32. A channel 76, defined by the valve core 56, receives the fuel from port 39 and directs it through the valve body 32 to the port 41. At that time the fuel is discharged into the conduit 42. The fuel within conduit 42 is directed to the pump 38. The pump 38 directs the fuel through conduit 46 into carburetor 44. All excess fuel at the carburetor 44 is directed past the carburetor through conduit 48 eventually being discharged through port 54 into a channel 78 defined by the valve core 56. The fuel within channel 78 is directed to the port 66 and is subsequently channeled into conduit 64, which conduit eventually discharges the fuel into the external fuel reservoir 70.

As shown in FIG. 3, a valve body and associated fuel system of the instant invention provides a means whereby fuel may be drawn from the tank 36 of a first vehicle, passed through the valve 32 (due to the action of fuel pump 38 of that first vehicle) and be directed not only to maintain the operation of the first vehicle's engine by induction of that fuel through the carburetor 44, but furthermore all excess of fuel not utilized by the carburetor 44 is directed past the carburetor through the valve body 32 into the fuel reservoir or fuel system 70 of a second vehicle.

Figure 4:
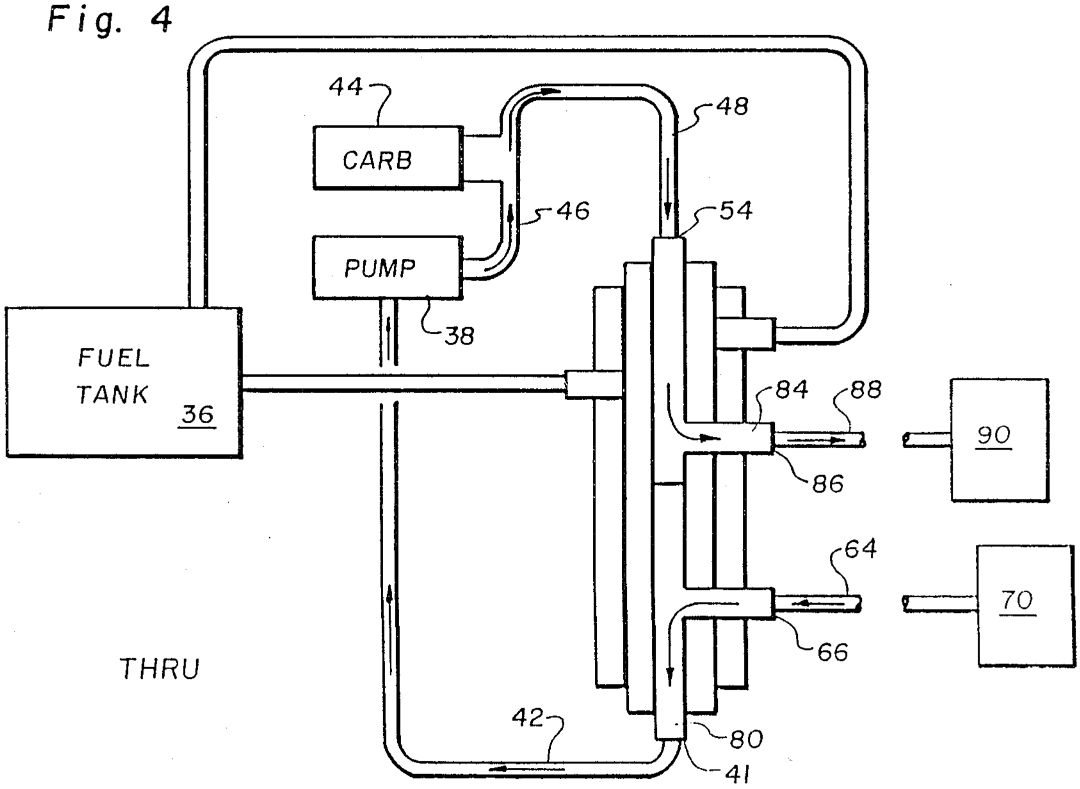
FIG. 4 is a schematic diagram showing the fourth orientation of the invention.

FIG. 4 illustrates a fourth orientation of the valve core body 56 which facilitates the transfer of fuel from a second exterior vehicle fuel reservoir 70 through the fuel system of the first accessory-fitted vehicle and thereafter to a third vehicle's fuel reservoir.

A second vehicle fuel reservoir identified generally as 70, provides fuel which is withdrawn from that tank through conduit 64 and through port 66. Valve core 56 defines conduit 80 which channels fuel from the port 66 to the port 41. Port 41 transfers the fuel to conduit 42. It is to be understood that the tranfer of the fuel from exterior source 70 through the aforementioned conduit and channel is affected by the vacuum produced by pump 38. Upon the pump 38 receiving the fuel from conduit 42, that fuel is transferred via conduit 46 into the carburetor 44. All fuel received by carburetor 44 in excess of the fuel requirements of the first vehicle's engine is transferred through conduit 48 to port 54 of valve body 32.

The valve body 56 defines a channel 84 which connects port 54 with port 86. Port 86 is fitted with a conduit 88 adapted to receive fuel from the channel 84 and direct that fuel to the fuel reservoir of a third fuel system, generally 90.

The instant invention is adapted to utilize the pump 38 of the accessory-fitted vehicle to draw fuel from the fuel reservoir or fuel system of a second vehicle through the valve 32 and the pump 38. Thereafter, that fuel is used not only to operate the engine of the accessory-fitted vehicle, but furthermore, all excess of fuel supplied by the pump 38 to carburetor 44 is directed past the carburetor through a channel 48 back through the valve 32 and subsequently is discharged into the fuel reservoir of a third exterior fuel system.

Figure 5:
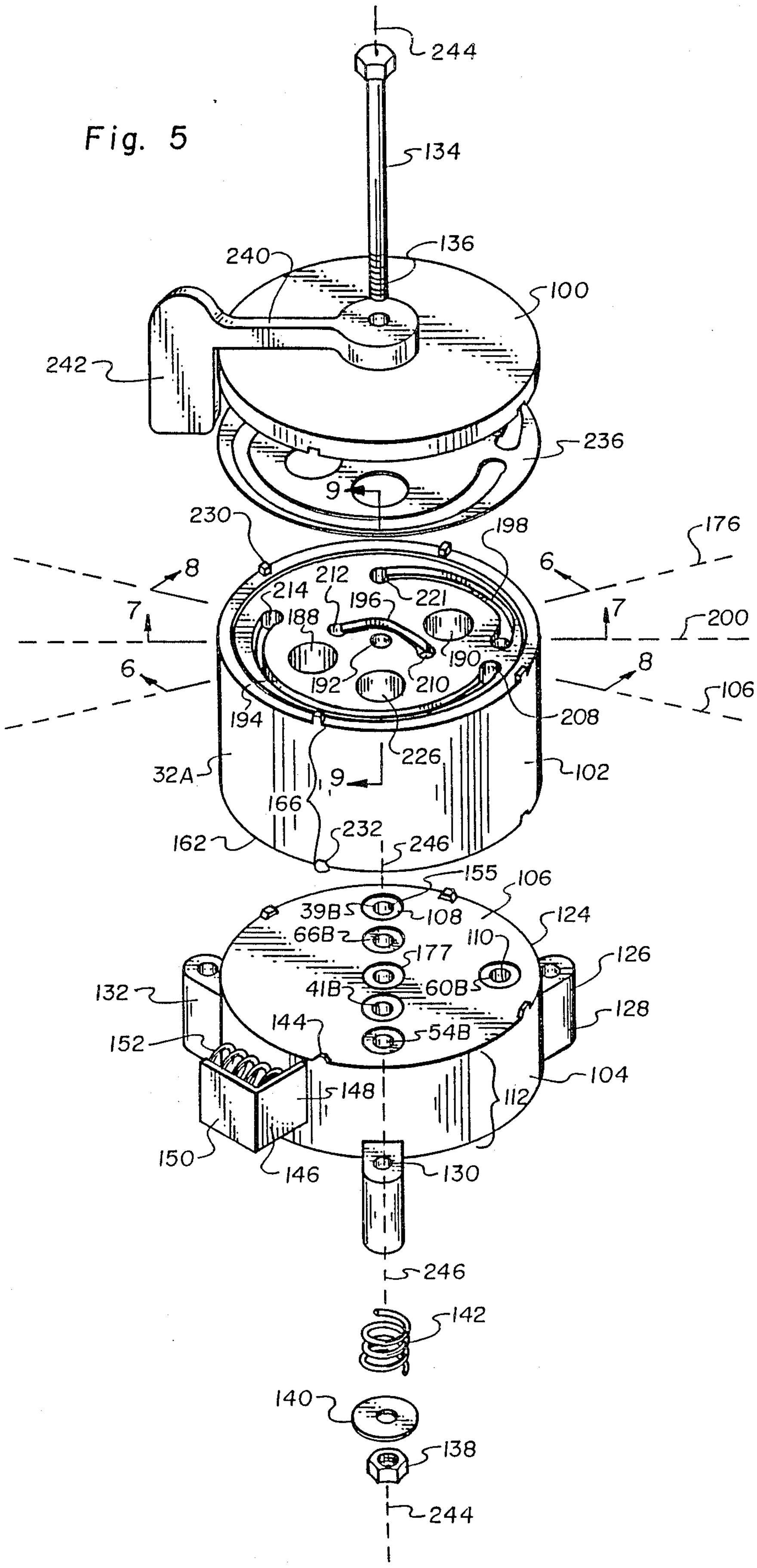
FIG. 5 is an exploded view of a first embodiment of the valve of the instant invention.

FIGS. 5 through 14 illustrate a first embodiment of the valve 32 of the instant invention. As shown in FIG. 5, the valve may consist generally of a first disk-like section 100, which is associated with a second cylindrical, channel fitted, member 102. Member 102 sits atop a second disk-like or cylindrical member 104, which likewise defines a plurality of channels therein.

The disk-like or cylindrical section 104 includes a first planar surface 106 which communicates with a plurality of channels, generally 108. The channels 108 also communicate with the bottom surface 114 of the cylindrical member 104. Each of the channels 108 is aligned parallel one another through the height of member 104 along a respective linear axis 246. Another channel, generally 110 also extends through member 104. Channel 110 is not aligned along axis 246. The channels 108 and 110 are generally cylindrical in configuration and extend throughout the entire height 112 of the cylindrical member 104 maintaining a generally constant diameter.

Figure 10:
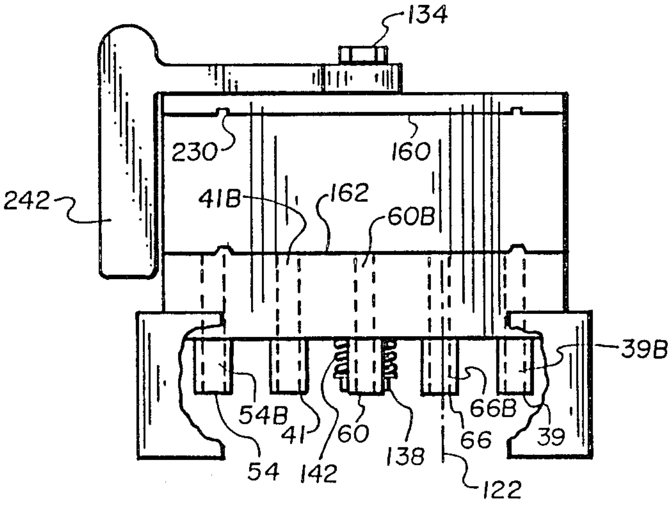
FIG. 10 is a side view of the valve shown in FIG. 5 showing a plurality of nozzles affixed to the lower regions of the valve; the channels associated with those nozzles are shown in phantom.

As shown in FIG. 10, the cylindrical member 104 includes a second bottom planar surface 114 which is oriented substantially parallel to the surface 106. Fitted on the surface 114 is a plurality of nozzles, generally 116. Each of the nozzles 116 is mounted to communicate with a respective channel 108 and 110. Each nozzle 116 extends outwardly from and substantially perpendicular to the surface 114. Each of the nozzles 116 defines a hollow interior channel 118 which communicates with a respective channel defined 108 and 110.

Each of the nozzles 116 as well as the channels 108 and 110 is each arranged about a respective longitudinal axis 122. As shown by FIG. 10, each longitudinal axis 122 is oriented parallel to each of the other longitudinal axes 122. Each longitudinal axis 122 is perpendicular to the planar surface 106 as well as the planar surface 114.

A nozzle 54A is fitted on the surface 114 of member 104 and corresponds to the port 54 shown in FIGS. 1 through 4. Nozzle 66A corresponds to port 66 in the figures. Nozzle 60A corresponds to port 60. Nozzle 41A corresponds to port 41. Nozzle 39A corresponds to port 39. Each of the aforementioned nozzles is connected to a respective channel 108, which channel is identified by a corresponding number and a letter "B" designation, e.g., nozzle 41A is connected to a respective channel 108, which is designated channel 41B. Proximate each of the channels 108 is an annular shaped recess well defined within the planar surface 106. Each of these recess wells is fitted with an O-ring type seal 157. Proximate the channels 110 is likewise defined recess well 155 which is fitted with its accompanying O-ring seal 157.

Fitted about the circumference 124 of cylindrical member 104 is a plurality of mounting members, generally 126. As shown in FIG. 5, each of these mounting members 126 includes an outwardly extending bracket 128, which defines a channel 130 therein. Each channel 130 extends through the height of the bracket 128. The brackets 128 are adapted together with their channels 130 to receive a bolt or screw-like member therethrough which may be threadedly connected to a suitable support structure.

The central channel 108 is suitably dimensioned to receive a bolt 134. As shown in FIG. 10, the bolt 134 extends through the entire height of valve 32 as well as outwardly of the face 114 of cylindrical member 104. The bolt includes a plurality of threads 136 which are dimensioned and configured to mechanically relate with a nut 138. As shown, a nut 138, a washer 140 and an associated coil spring 142, are positioned, in that order, proximate the face 114 of cylindrical member 104, and secured together by the action of the nut 138 on the bolt 134 whereby the cylindrical member 102 and 104 and the disk 100 are in a abutting relationship in a spring-biased orientation.

Fitted on the surface 106 of cylindrical member 104 is a plurality of upstanding nipples or extensions 144.

Fitted on the sidewall 113 of cylindrical member 104, is an outwardly extending L-shaped bracket, generally 146. The bracket 146 includes a first extension 148. Extension 148 extends substantially perpendicularly from the sidewall 113 of the cylindrical member 104. Mounted on the end of extension 148 is a perpendicularly oriented second panel 150. The bracket 146 serves as a housing for a spring 152, which, as shown, may be a coil-shaped spring. The spring is oriented tangentially to the sidewall 113.

Positioned in an abutting relationship with the cylindrical member 104 is a first cylindrical member, designated generally 102. As shown in FIG. 5, cylindrical member 102 includes a first planar face 160 and a corresponding opposing planar face 162. Each of the planar faces 160 and 162 is oriented substantially parallel to one another so as to define the generally cylindrical-type configuration of member 102.

The O-ring seals 157 abut against surface 162 to form an airtight seal of the channels 108 and 110 with surface 162. Positioned within the body of cylindrical member 102 is a plurality of channels. The channels 163 are three types designated generally channels 164, 170 and 171. The channels, designated generally 164, extend completely through the height 166 of cylindrical member 102. The channels, generally 170, extend from the planar face 162 upward into member 102 and intersect or communicate with the surface 160 of cylindrical member 102, i.e., channels 170 extend only partially through the height of member 102. The channels 172 extend from the planar face 160 downward into the cylindrical member 102. Channels 172 do not intersect the face 162 of that member 102, i.e., channels 172 extend only partially through the height of member 102. A plurality of channeled grooves 174 are configured within the surface 160 of the cylindrical member 102. Channels 170 do not interconnect a channel of the type designated 170.

Figure 11:
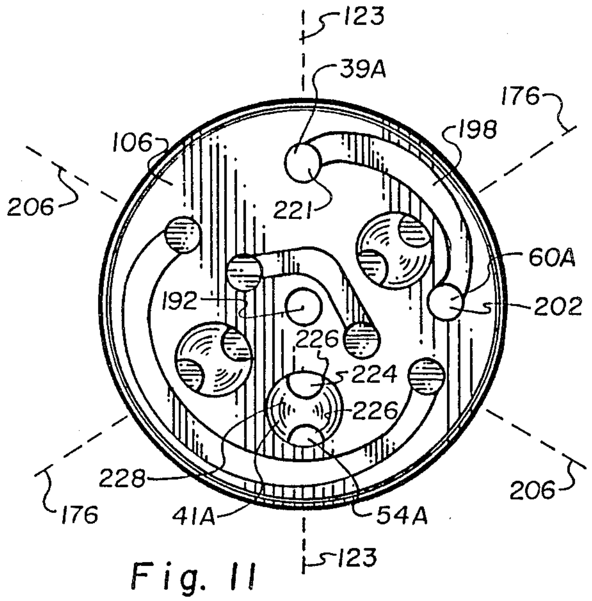
FIG. 11 is a top view of the two channeled cylindrical members of the valve shown in FIG. 5 showing those members in a first orientation.
Figure 12:
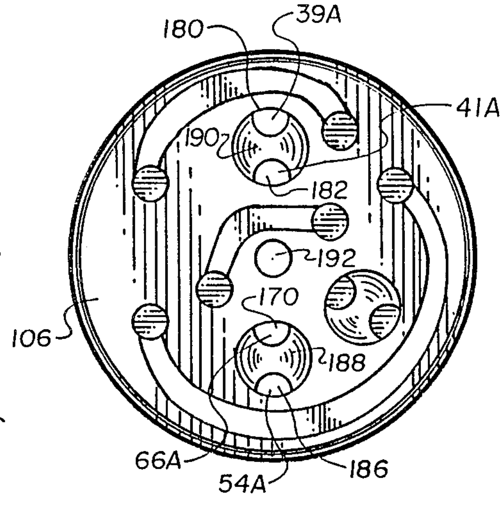
FIG. 12 is a top view of the channeled portion of the valve shown in FIG. 5 corresponding to the orientation shown in FIG. 7 taken along sectional lines II—II.
Figure 13:
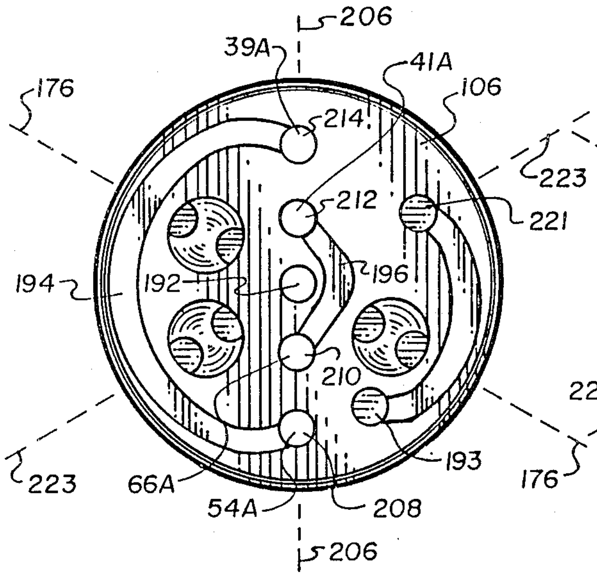
FIG. 13 is a top view of the channeled portion of the valve shown in FIG. 5 corresponding to that illustrated in FIG. 8, i.e., taken along sectional lines III—III.

The various types of channels 170, 164, 172 and 174 are positioned about the surfaces 160 and 162 of cylindrical member 102 in the arrangement and orientation shown generally by FIGS. 11, 12, and 13.

Figure 14:
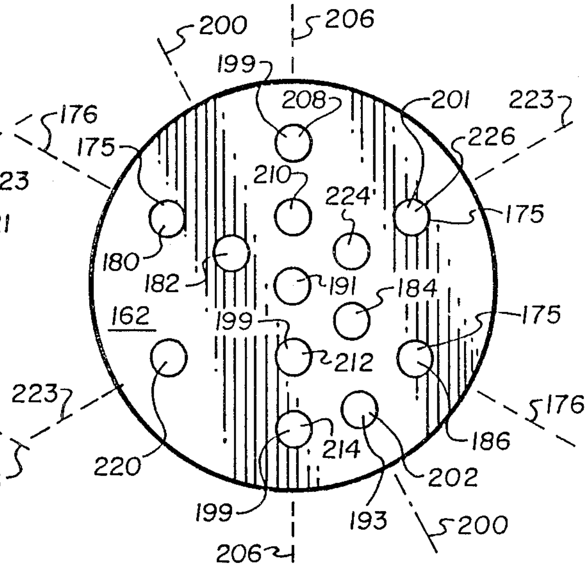
FIG. 14 is a bottom view of the upper cylindrical member of the valve shown in FIG. 5.
Figure 15:
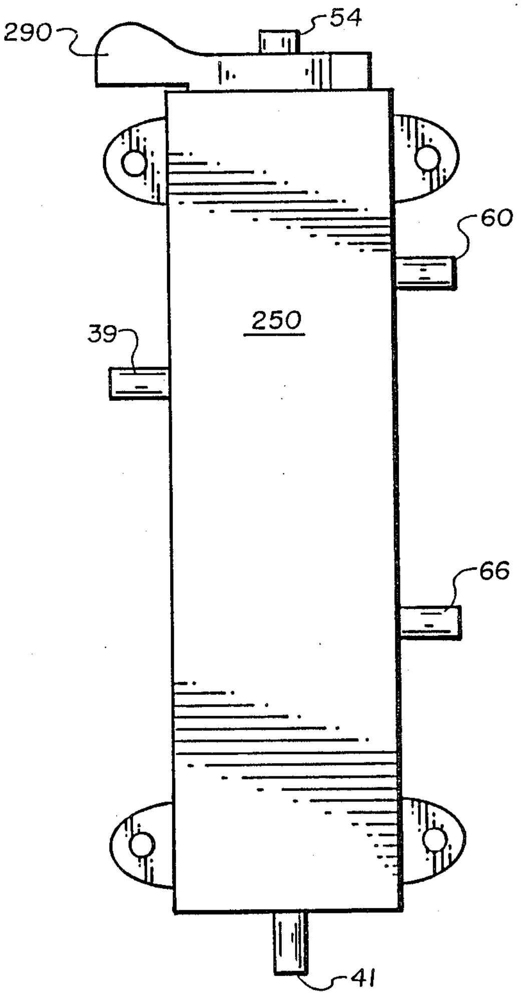
FIG. 15 is a side view of a second embodiment of a valve system of this invention.

The orientation of the various channels 174, 172, 170 and 164 may be understood by comparing FIGS. 5 through 9 and 11 through 14. FIG. 14 illustrates the orientation of the channels on the lower surface 162 of cylindrical member 102. The channels 163 may be viewed as being arranged along three principal linear axes.

Figure 6:
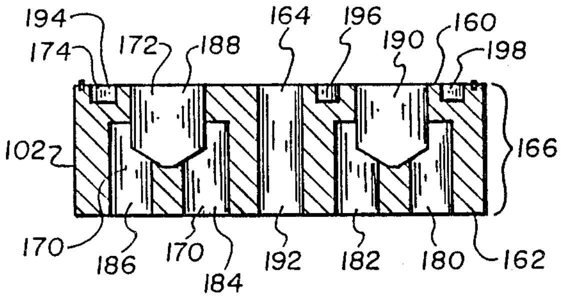
FIG. 6 is a cross-sectional view of the upper channel fitted cylindrical member of the valve shown in FIG. 5 taken along sectional lines 6—6.
Figure 7:
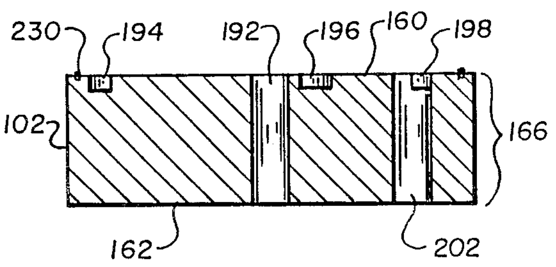
FIG. 7 is a cross-sectional view of the upper channel fitted cylindrical member of the valve shown in FIG. 5 taken along sectional lines 7—7.
Figure 8:
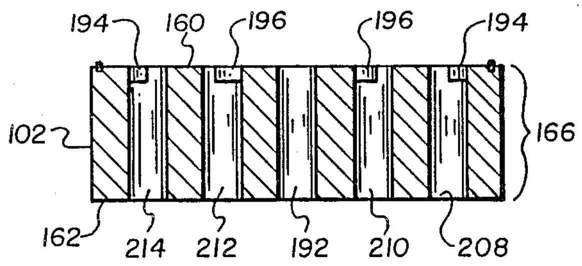
FIG. 8 is a cross-sectional view of the upper channel fitted cylindrical member of the valve shown in FIG. 5 taken along sectional lines 8—8.
Figure 9:
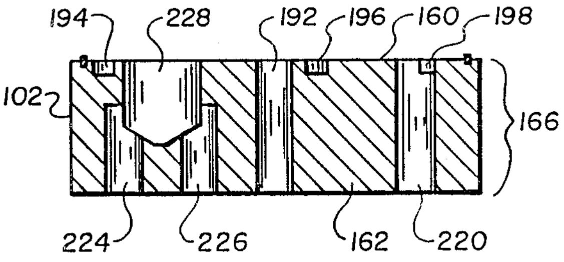
FIG. 9 is a cross-sectional view of the upper channel fitted cylindrical member of the valve shown in FIG. 5 taken along sectional lines 9—9.

A first set 175 of channels 163 includes five equally spaced channels oriented along a linear axis, generally 176. When the valve 32 is assembled, the central-most channel 192 of this first set 175 communicates with a channel 177 defined within the body of cylindrical member 104. Channel 164 extends completely through the height 166 of the cylindrical member 102. The other four channels which are positioned along the axis 176, are designated channels 180, 182, 184 and 186. Each of these channels is of the type designated above as channel type 170. Each of the four channels 175 extends upward from surface 162, as shown in FIG. 6, into member 102. Each of these channels extends only partially through the height 166 of member 102 and at its uppermost region communicates with one of a pair of channels of the type designated channel type 172. Each of the two channels 172 extends downwardly from the surface 160 of member 102. Both channels 172 extend only partially through the height of member 102. Each of these two channels 172, which are identified respectively as 188 and 190, communicate respectively with a pair of channels 170. The central-most channel 192 forms a channel dimensioned to slidably receive the pivot bolt 134.

The generally C-shaped (in plan view) channels, which are designated respectively as 194, 196 and 198, do not have any type of communication with the lower surface 162 of cylindrical 102 in the orientation shown in FIG. 6.

A second set of channels 193 are configured within the cylindrical member 102 to be oriented along a linear axis 200. This set of channels includes only two channels. One of these channels is the centrally positioned channel 192. The second channel 202 extends the complete height of cylindrical member 102. This channel 204 communicates with the C-shaped channel 198, and provides a means whereby that channel 198 may communicate through member 102 to the planar surface 162 of that member.

A third set of channels 199 is oriented along the linear axis, generally designated as 206. This set of channels includes five distinct channels, identified as channels 208, 210, 192, 212 and 214. The channel 192 is the same channel as that described previously.

Channel 214 communicates with the channel 194 and forms the end most region of that C-shaped channel 194. Positioned diametrically opposite channel 214 is a channel 208 which is also connected with channel 194. Channel 208 communicates with the other end of the C-shaped channel 194. Channel 208 extends through the complete height of member 102. The channels 214 and 208 form a means whereby the channel 194 may communicate through the height of cylindrical member 102 to the face 162 of that cylindrical member 102.

Channel 212 extends through the complete height of channel member 102. Channel 212 communicates with one of the end most region of the C-shaped channel 196. Positioned substantially opposite channel 212 is channel 210. Channel 210 communicates with the opposing end region of the C-shaped channel 196. The channels 212 and 210 each communicate with the C-shaped channel 106 and provide a means whereby channel 196 may communicate with the planar face 162 of cylindrical member 102.

A fourth set of channels 201, which are positioned along longitudinal axis 223, are identified generally as channels 221, 191, 224 and 226. Channel 221 extends through the complete height of member 102. Channel 221 communicates with the exterior planar surface 160 of cylindrical member 102. Channel 221 communicates with the end most regions of the C-shaped channel 198. Channel 221, in conjunction with channel 202, provides a means whereby the C-shaped channel 198 may communicate with the planar surface 162 of cylindrical member 102. Channels 224 and 226 are of the type generally designated as channel type 170, i.e., these channels do not extend completely through the height of cylindrical member 102. Each of the channels 224 and 226 communicate with a channel 228 which extends from the surface 160 inwardly into the body of cylindrical member 102. Channel 228 is of the type generally designated as channel type 172.

Fitted on the circumference or outer perimeter of the planar surface 160 of cylindrical member 102 is a plurality of upstanding or upright nipples designated 230. Positioned within the face of planar surface 162 of that same cylindrical member are a plurality of notches or slots, designated generally 232. The slots 232 are adapted or sized in dimension to receive the upstanding nipples 144 of the lower cylindrical member 102. Nipples 230 are configured to have vertical upright walls whereas the nipples 144 have slanted upright walls. The nipples 144, together with the slots 232 which are adapted to receive those nipples 144, are adapted for a slidable interaction whereas the nipples 230 are adapted for a non-sliding relationship, as opposed to a slidable relationship with a a corresponding slot 234 defined in the cylindrical disk 100.

A gasket 236 is shown fitted against the planar surface 160 of cylindrical member 102. The gasket is a generally disk-like member having therein a plurality of cut-out regions which correspond in shape and dimension to the various channels defined within the planar surface 160. The gasket 236 is adapted to be placed over the surface 160 and in conjunction with the disk 100 is adapted to form a sealing relationship with those apertures and channels. In other words, the gasket 236 is adapted to preclude passage of fuel from one aperture in the face 160 of cylindrical member 102 to another, except through the C-shaped channels 194, 196 and 198.

The cylindrical disk 100 has fitted on its uppermost regions with a lever-type member, generally 240. As shown, this lever is fixedly mounted to the disk 100 and includes an outwardly extending tab 242 which extends downwardly. In a predetermined setting of the valve, the tab 24 is adapted to interact with the spring 152. This relationship is shown to advantage in FIG. 10 wherein that tab 242 extends along the complete height of the combined heights of disk 100 and cylindrical members 102 and 104 sufficiently to interact with spring 152.

In its assembled condition, the valve 32 permits a slidable rotation of the manually connected sections 100 and 102 with respect to a cylindrical member 104 which is fixedly mounted to the vehicle. As the assembly rotates about a vertical axis 244, planar surface 164 slides over surface 106, the arrangements and orientations of the various apertures and channels housed within cylindrical member 102 change, i.e., the orientations of the channels in members 102 and 104 vary. FIGS. 11 through 13 illustrate the orientation of the various channels and apertures within cylindrical member 102 with relationship to those in cylindrical member 104 as the assembly is rotated with respect to the cylindrical base 104.

To better understand FIGS. 11 through 13, the channels within base 104 are considered to be aligned along an axis 246. In FIGS. 11 through 13, the existence of an open channel is shown by the channel being devoid of any markings with the channel boundary. The indication of a closed channel is shown by the aperture being shaded in. The orientation of the members 102 and 104 as shown in FIG. 11, corresponds generally to the schematic drawing shown in FIG. 1, i.e., the orientation provides for the operation of the vehicle's engine by drawing fuel from the fuel tank and channeling that fuel to the carburetor and thereafter returning all portions of the fuel not used once again to the fuel tank.

More specifically, fuel enters the cylindrical member 104 through port 39 being thereafter directed through channel 39A. The fuel is then directed through that channel 39A into the associated channel 221 of member 102. Exiting that channel 221 into the C-shaped channel 198, the fuel is thereafter directed along the length of channel 198 until reaching channel 202. The fuel is channeled through channel 202, eventually being discharged outward from the valve 32 through channel 60A into a connected conduit 42. As shown in FIG. 1, the fuel thereafter is cycled through the pump and past the associated carburetor being eventually returned to the valve 32 through conduit 48.

The fuel is received through channel 54, and introduced through channel 224 into channel 228 and thereafter through channel 226. From channel 226 it is directed downwardly through channel 41B and directed outwardly through port 41 into a conduit 50. Conduit 50 directs the fuel back to the fuel tank 36.

The orientation of the cylindrical members 102 and 104 illustrated in FIG. 12 corresponds to the schematic drawing designated FIG. 3. This orientation of the valve facilitates the transfer of fuel from the fuel tank 36 of the accessory mounted vehicle outwardly into the fuel reservoir of an exterior fuel system, designated generally 70.

In this orientation (FIG. 12), fuel is received through conduit 40 from the tank 36 into the channel 39A of cylindrical member 104. Thereafter it is directed through channel 39A, being eventually received by channel 180. Fuel is thereafter directed upward through channel 180 into channel 190. From channel 190 it is directed downward through channel 182 to be received in channel 41A. Thereafter the fuel is discharged into conduit 42A which transfers the fuel from the valve 32A to the pump 38 and its associated carburetor 44. All excess fuel over that required in the carburetor is channeled through conduit 48 to be received in channel 54A of the lower cylindrical member 104. The fuel is thereafter transferred through channel 54A, being received into channel 186. The fuel is directed from channel 186 into channel 188 and from channel 188 downward through channel 184. The fuel is thereafter transferred to the channel 66A, whereafter it is delivered to a conduit 64 which is directed to the receiving exterior fuel system 70.

The orientation of cylindrical members 102 and 104 shown in FIG. 13 corresponds to the schematic drawing shown in FIG. 2, i.e., the orientation of the valve which is adapted to transfer fuel from an exterior source 70 to the fuel tank 36 and carburetor 44 of the accessory fitted vehicle.

In this orientation (FIG. 13), fuel is received from the exterior source 70 through conduit 64. It is received by the valve 32A through channel 66A. It is thereafter channeled into channel 212. Upon rising through the full height of channel 212, the fuel is directed into the C-shaped channel 196. Upon following the length of that channel 196 it is directed into channel 212 from which point it is directed downwardly through channel 41A, eventually exiting into a conduit 42. Conduit 42 directs the fuel into the pump 38 and thereafter into the carburetor 44 through means of conduit 46.

The quantity of fuel in excess of that required by the carburetor 44 is directed through conduit 48 into the receiving channel 54A of the valve 32A. The fuel is thereafter directed into channel 208. Upon rising through the entire height of channel 208, the fuel is received within the C-shaped channel 194. Upon the fuel being directed along the full length of channel 194 it is received within channel 214 and directed downward through that channel until reaching channel 39A. After coursing through channel 39A, it is directed outwardly through the port 39 into a conduit 40 which channels the fuel into the fuel tank 36.

As may be recognized by the above discussion, the embodiment as heretofore described is functionable in three orientations. Those orientations may be designated a normal mode, a transfer-in mode and a transfer-out mode. In the normal mode fuel is transferred through the valve directly to the pump and carburetor. Thereafter all excess fuel from the carburetor is returned to the fuel tank. The transfer-in mode is operative to receive fuel from a second or exterior fuel source and direct that fuel through the pump and past the associated carburetor of the accessory fitted vehicle and thereafter return all excess of fuel which has been driven past the carburetor to the fuel tank of the accessory fitted vehicle. The transfer-out mode, which is the third mode, functions to receive fuel from the tank of the accessory fitted vehicle, transfer that fuel through the pump and past the associated carburetor of the accessory fitted vehicle and thereafter channel all excess of fuel back through the valve and outward to an exterior fuel system.

It may be recognized that the orientations shown in FIGS. 11, 12 and 13 align or make parallel the axis designated "V" of the lower cylindrical member 102 with respective axes 179, 176 and 181 of the cylindrical member 102. This embodiment may be modified to include a fourth mode of operation, e.g., transfer thru mode.

Figure 16:
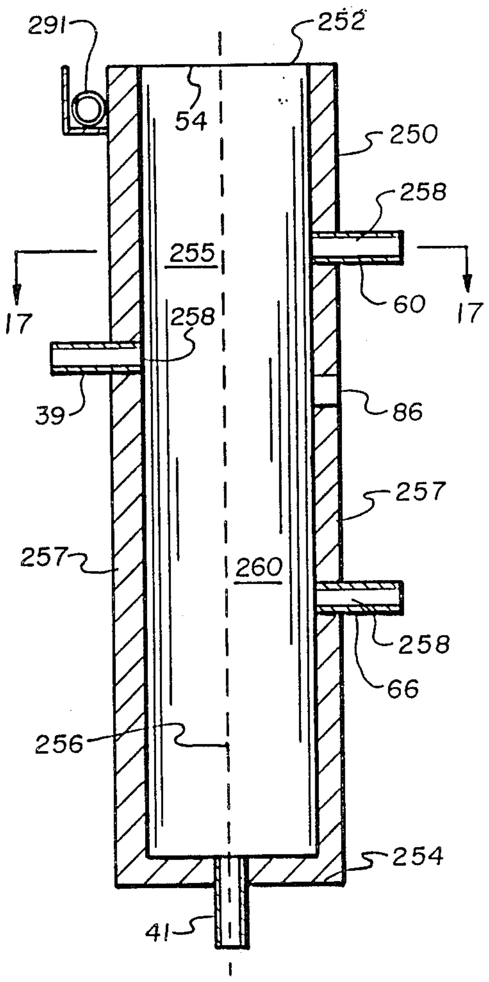
FIG. 16 is a cross-sectional side view of a valve casing of a second embodiment of this invention shown in FIG. 15.
Figure 17:
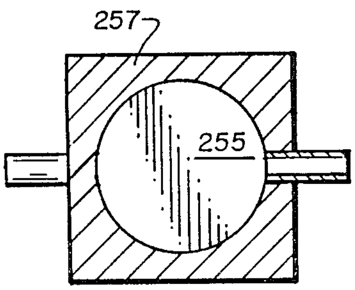
FIG. 17 is a top view of a second embodiment of a valve of the instant invention.

A second embodiment of the invention is illustrated in FIGS. 15 through 21. In this configuration, an elongated hollow valve casing, identified generally as 250, as an open end 252 and an opposing open end 254 communicating with a hollow cylindrical channel 255 which extends the full length of that casing. The casing 250 is oriented about a longitudinal axis 256. Defined within the sidewalls 257 of that casing are a plurality of ports 258. These ports 258 are each fitted with a nozzle fitting, generally 257. The ports 258 correspond to the ports identified in the schematics of FIGS. 1 through 4, i.e., the ports 39, 54, 60, 86, 66 and 41. The generally cylindrical, hollow cavity 255 communicates with the open end 252 and closed end 254. Fitted slidably within the interior hollow channel 255 of the casing 250 is a core member 261, which is shown in FIGS. 18 through 21. The core member 261 includes a solid cylindrically shaped member defining therein a plurality of channels 262. The channels 262 are positioned within the core member 261 such that upon the rotation of that core about the longitudinal axis 256, the various channels 262 are aligned with various ports 258 heretofore described to form conduits for receipt and channeling of fuel received by the valve core 261. FIG. 17 is a top view of the core 261 and includes a series of sectional lines designated I, N and O, respectively, which correspond to the various FIGS. 10 through 21.

Figure 18:
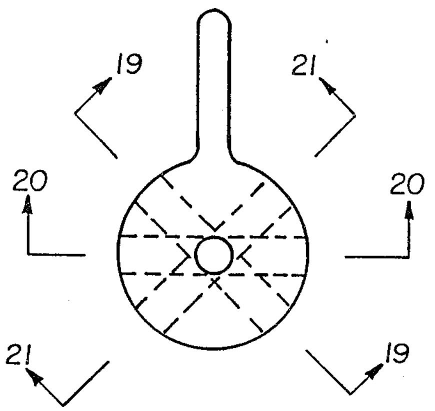
FIG. 18 is a top view of the valve core of the second embodiment of the invention illustrated in FIG. 15.
Figure 19:
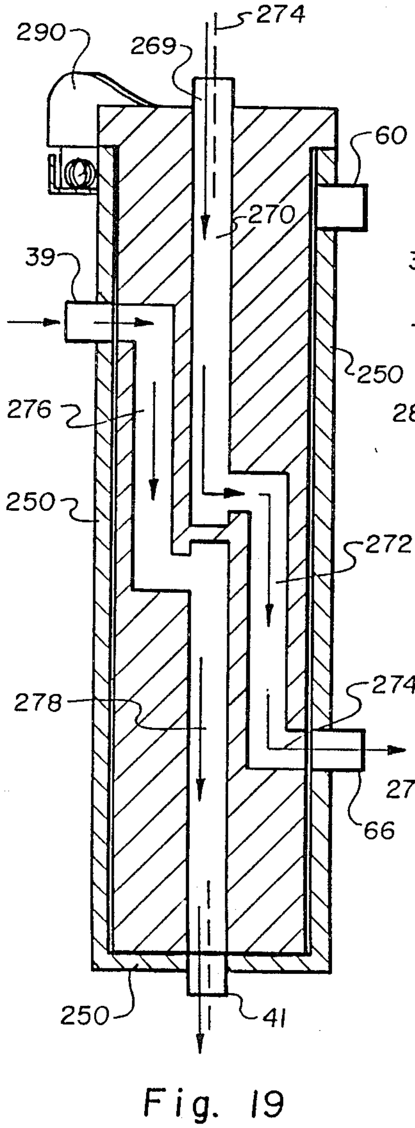
FIG. 19 is a cross-sectional side view of the valve casing with the second embodiment illustrated in FIG. 15 shown in a first orientation.

FIG. 19 is a cross sectional view of the valve core 261 taken along section lines 19—19 of FIG. 18. As shown, vertically upright channel, generally 270, is positioned centrally within the valve core 261. Channel 270 extends from the core's upper surface 271 downward to approximately the midway point of the height of that valve core 261. The channel 270 connects with a second elongate channel 272 which is oriented vertically is upright within the structure of the valve core 261. Channel 272 is oriented parallel to the longitudinal axis 274. Channel 272 communicates with an outwardly extending channel 274. Channel 274 communicates with the surface 275 of core 261 and is adapted to interface with port 66C within the wall of the casing 250. Fuel, which is received into channel 270 through port 269, may be directed through the valve core 261 to port 66. This fuel is then directed outwardly from the valve core as shown schematically in FIGS. 2 and 3 to an external fuel system 70. The valve core 261 also defines a channel 276 which is oriented vertically within the valve core 261 such that it is positioned parallel to the longitudinal axis 274. The channel 276 connects with a second channel 278 which may be viewed as substantially an extension of channel 270, i.e., it is oriented centrally within the structure of the valve core 261 and includes as its central axis the longitudinal axis 274 of the valve core 261. The channel 278 communicates with the end 275 of the valve core and is further adapted to communicate with the valve port 41. Fuel may be received into channel 276 through a port 39 defined within the valve casing 250. The fuel is then transferred through the length of channel 276 and into the channel 278 whereafter it is channeled to the port 41 and directed to the fuel pump as shown to advantage in FIGS. 1, 2, 3, and 4.

Figure 20:
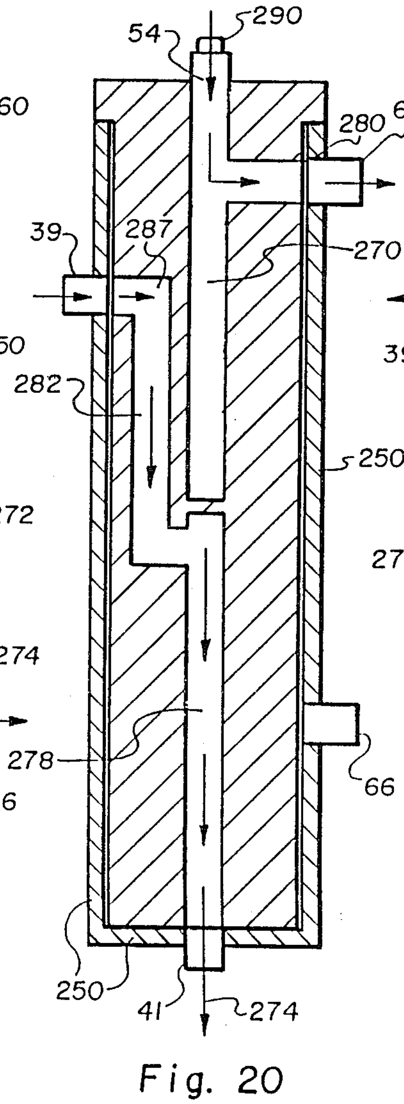
FIG. 20 is a cross-sectional view of the valve core assembly of the embodiment illustrated in FIG. 15 positioned in a second orientation.

FIG. 20 illustrates a cross section of the valve core taken along section lines 20—20. Similar to the valve core assemblies described in FIG. 19, the core assembly, as shown in FIG. 20, includes a centrally positioned elongate channel 270 and a similarly positioned channel 278. Channel 270 communicates with a channel 280 which extends radially outwardly from a longitudinal axis 274 to communicate with the surface of valve core 259. Channel 280 is further positioned to communicate with a port 60 defined within the wall of valve casing 250.

The channel 270 is positioned to receive fuel through a port 54 defined in the upper reaches of that channel, and thereafter direct that fuel outward through channel 280 and port 60. The fuel is directed into a connected conduit 34. Fuel is then received past the carburetor and directed through the channels of the valve core 259 being subsequently directed to return to the fuel tank 36.

Channel 278 is connected with a substantially upright vertical channel 282 which is elongate and has a longitudinal axis 284 which is parallel to the longitudinal axis 274 of the valve core. The channel 282 communicates with the surface of the valve core 259. The channel 282 is positioned to communicate with the port 39 defined within the sidewall of the valve casing 250. Fuel may be received through that port 39 from a conduit 40. Conduit 40 connects with a fuel tank 36. Fuel may be directed downward through channel 282 into channel 278 which subsequently communicates with the port 41. Port 41 is connected to a conduit 42 which serves to direct the fuel to the fuel pump of the accessory fitted vehicle fuel system.

Figure 21:
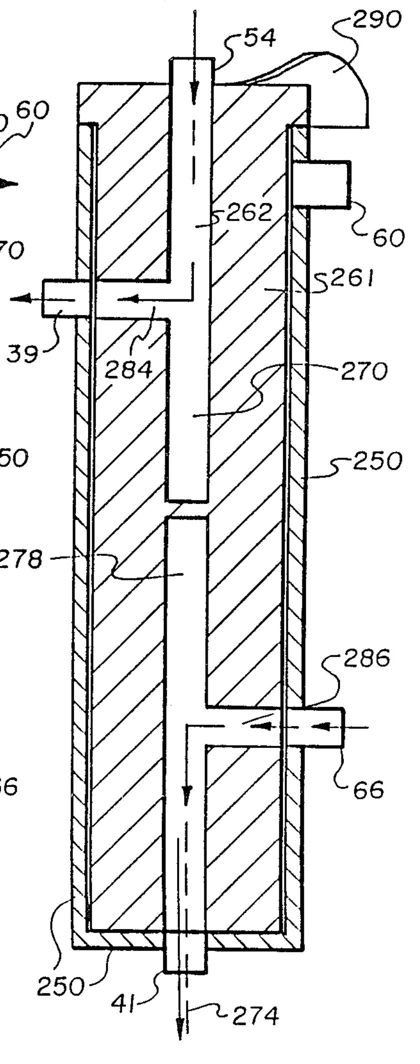
FIG. 21 is a cross-sectional view of a core assembly of the second embodiment illustrated in FIG. 15 shown in a third orientation.

As shown in FIG. 21, the cross-sectional view of the valve core 261 taken along sectional lines 21—21, includes the heretofore described centrally positioned channel 270, as well as channel 278. Both channels 270 and 278 are positioned parallel and colinear with the longitudinal axis 274. As shown, channel 270 communicates with an outwardly radiating channel 284 which is oriented to communicate the surface of valve core 259. The channel 284 is positioned to communicate with the port 39 defined within the sidewall of valve casing 250.

Channel 278 communicates with an outwardly extending channel 286. Channel 286 communicates with the surface of valve core 259 and is positionable to communicate with port 66 defined with the sidewall 257 of valve casing 250. The invention provides a means whereby fuel may be received from a port 54, and directed into a channel 270. Subsequent to its entry into channel 270, the fuel is directed through channel 284 to port 39. From port 39 it is directed to a conduit 40 and subsequently to a fuel tank 36. The channels 270 and and 284 receive all excess fuel flowing past a carburetor 44 and direct it via port 54 outwardly through the valve body to conduit 40 and subsequently to the fuel tank 36.

Channels 278 and 286 of the valve system provide for the receiving fuel from a conduit 64 which is connected with an exterior fuel system 70. The fuel is received through conduit 64 into the port 66 within the valve casing 250. Thereafter the fuel is directed into channel 286 and subsequently into channel 278. The fuel is thereafter directed downward to the port 41 and subsequently introduced into the conduit 42. The fuel is subsequently directed to the fuel pump 38.

The valve core 259 is fitted with a lever 290 adapted to rotate the valve core about its longitudinal axis 274. The rotation permits the orientation of the various channels in association with the valve ports fitted within the exterior walls of the casing.

The valve casing 250 is preferably fitted with a safety mechanism for automatically returning the valve core from the orientation shown in FIG. 20 to that shown in FIG. 21. This safety mechanism requires the user to manually hold the lever 290 in the position shown in FIG. 19 during the operation of the valve system while in that position. Upon the user's release of the lever 290, a spring means 291 urges the lever 290 to return to the orientation shown in FIG. 21. This reduces the likelihood that the user will operate the system of fill an exterior fuel system, thereafter detach the conduit 64 from that fuel system and then proceed to operate the accessory fitted vehicle without first readjusting the valve.

As may be appreciated, unless the valve is positioned in an orientation other than that shown in FIG. 19, the valve system would function to continue channeling fuel outward through conduit 64 onto the road surface.

In FIG. 16, a spring housing 293 is shown mounted on the upper sidewall 257 of valve casing 250. The housing 293 is configured to support a spring 291 positioned to abut against lever 290 as that lever is pivoted counterclockwise to position the valve core in the orientation shown in FIG. 20. As the lever is urged into the FIG. 20 orientation, the spring 291 is compressed generating a return force on the lever. Upon the user ceasing to urge the lever in a counterclockwise direction, the return force urges the lever to the orientation shown in FIG. 21.

FIGS. 22 through 26 illustrate a third embodiment of the instant valve mechanism. This third embodiment is substantially similar to that shown in FIGS. 15 through 21 with the exception that the exterior port structure has been modified. This modification of the port structure permits an interior valve core assembly which is substantially simplified over that shown in FIGS. 15 through 18.

Figure 22:
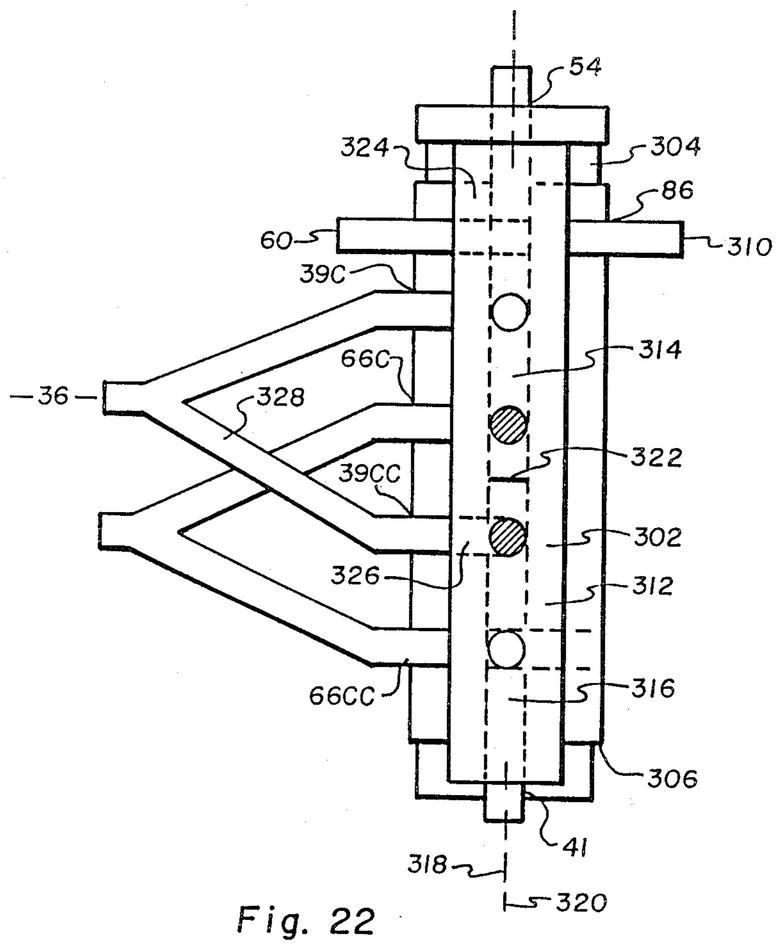
FIG. 22 is a cross-sectional side view of a third embodiment of the instant invention or valve thereof shown in a first condition.

In FIG. 22, a valve of this third embodiment is shown in a normal operating mode, i.e., one in which the fuel is directed from the tank of the accessory fitted vehicle. Channeled to the fuel pump of that vehicle and thereafter all excess fuel received at the carburetor from the fuel pump is directed by the valve back to the fuel tank if the vehicle was originally equipped with a fuel overflow system.

The valve mechanism includes an exterior valve casing generally 300 which is cylindrical in shape. Casing 300 has a substantially cylindrical interior cavity 302 defined therein. The interior cavity 302 has an open end 304 and an opposing open end 306. Within the sidewalls 308 of the casing 300 are defined a plurality of ports. These ports are generally identified as 39C, 39CC, 54C, 86C, 66C, 66CC, 41C. Each of these ports is fitted with a generally cylindrical nozzle generally 310 which is slidably fitted within the port and defines a nipple or fitting surface upon which may be mounted a conduit. Fitted within the cylindrical, hollow cavity of casing 300 is the valve core identified generally as 312. The valve core defines a channel 314 and a channel 316. Both channels are oriented vertically within the structure of the valve core 312 and are positioned such that its longitudinal axis 318 is colinear with the longitudinal axis 320 of the valve core. Channel 314 is separated from communicating with channel 316 by an impermeable wall 322.

As shown in FIG. 22 in cross section, the channel 314 communicates with a channel 324. Channel 324 extends outwardly from the longitudinal axis 318 and communicates with the surface of valve core 312. The channel 324 is positionable to communicate with port 60C defined within the valve casing 300. The valve core is positioned to in FIG. 21 to direct fuel received into the channel 314 through port 54 and thereafter be directed outwardly through channel 324 into port 60. At that point the fuel is directed into a conduit 50. Conduit 50 is connected onto the nozzle 310 which has been fitted into port 60. The conduit 50 directs the fuel into the fuel tank 36 as shown in FIG. 1. Conduit 316 communicates with a channel 326, which extends outwardly from the longitudinal axis 318 of the valve core 312. Channel 326 communicates with the surface of the core 312 and is positionable to communicate with 39CC. In this orientation shown in FIG. 21, fuel received through the conduit 328 from the fuel tank 36 is received within the channel 326, thereafter it is directed into channel 316 and subsequently exiting the valve core 312 through port 41 and its associated conduit 42. Conduit 42 leads to pump 38 as shown to advantage in FIG. 1. The orientation of the valve core and valve casing assembly as shown in FIG. 22 effectively accomplishes the valving as shown in FIG. 1.

Figure 24:
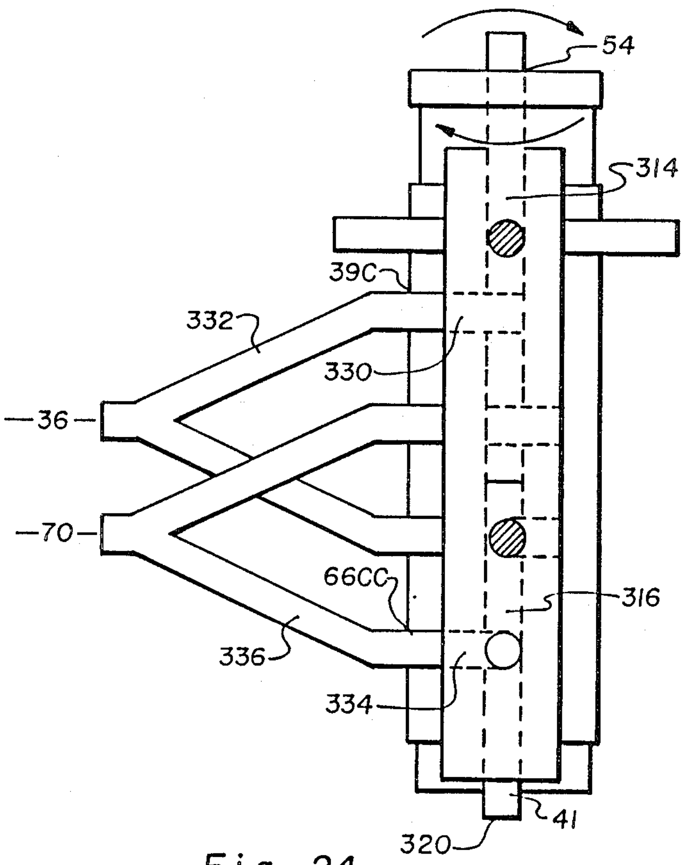
FIG. 24 is a side cross-sectional view of a valve of the instant invention, namely a third embodiment thereof shown in a third orientation, i.e., a transfer-in mode.

The valving shown in FIG. 2 may be accomplished by the orientation of the valve core 312 as shown in FIG. 24. The central channel 314 is positioned to interface with an outwardly extending, generally cylindrical channel 330 which interfaces with the port 39C. Fuel may therefore be introduced through port 54 atop the core 312 and directed into channel 314. Upon reaching the end of channel 314 the fuel is transferred into the channels 330 which deliver the fuel to port 39C. Channel 39C directs the fuel through conduit 332 which eventually deposits the fuel in fuel tank 36.

The lower channel 316 communicates with a channel 334 which extends radially outward from the longitudinal axis 318 and communicates with the surface of the valve core. The channel 334 is positionable to communicate with port 66CC. Fuel received from an exterior fuel source 70 through conduit 336 and its port 66CC is directed through channel 334 into channel 316 which thereafter directs the fuel through port 41 into conduit 42. Conduit 42 subsequently directs the fuel into pump 38, as is shown in to advantage in FIG. 2.

Figure 23:
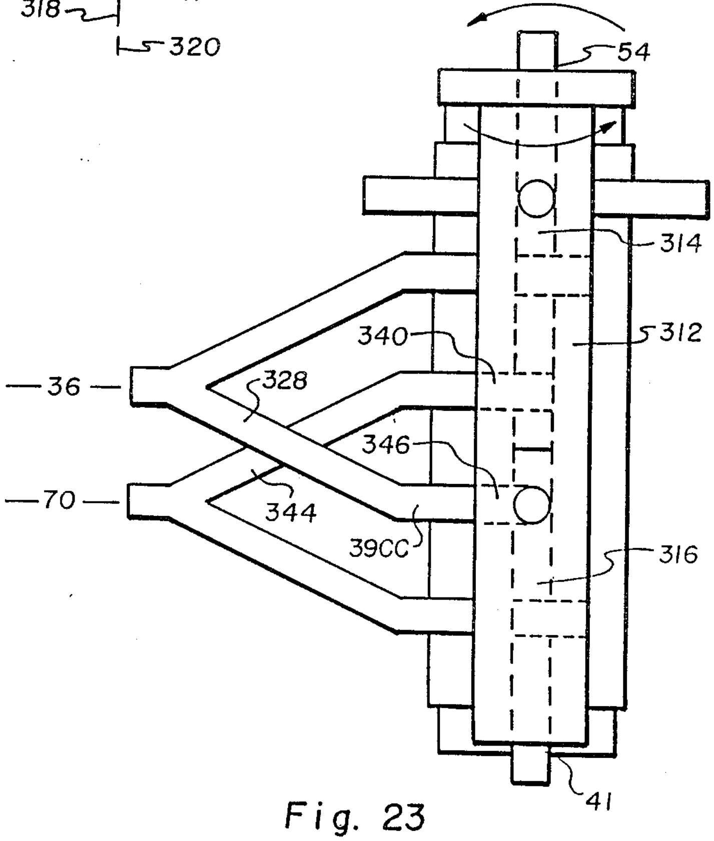
FIG. 23 is side cross-sectional view of the third embodiment shown in FIG. 19 positioned in a second orientation transfer-out mode.

A valve system which accomplishes the conduction of the fuel as illustrated in FIG. 3 is illustrated in FIG. 23. The valve core 312 includes a channel 340 which communicates with the channel 314. Channel 314 directs fuel, introduced through port 54 into channel 314, through channel 340, to port 66C into conduit 344. Conduit 344 is connected with an exterior fuel reservoir or fuel system 70. The lower channel 316 communicates with a channel 346 which communicates with the surface of the valve core. Channel 346 is positionable to communicate with port 39CC, whereby fuel received from fuel tank 36 may be directed through conduit 328 through port 39CC into channel 346 and subsequently downward through channel 316. The fuel is then directed outward through port 41 into a conduit 42 and is subsequent directed to the fuel pump 38.

Figure 25:
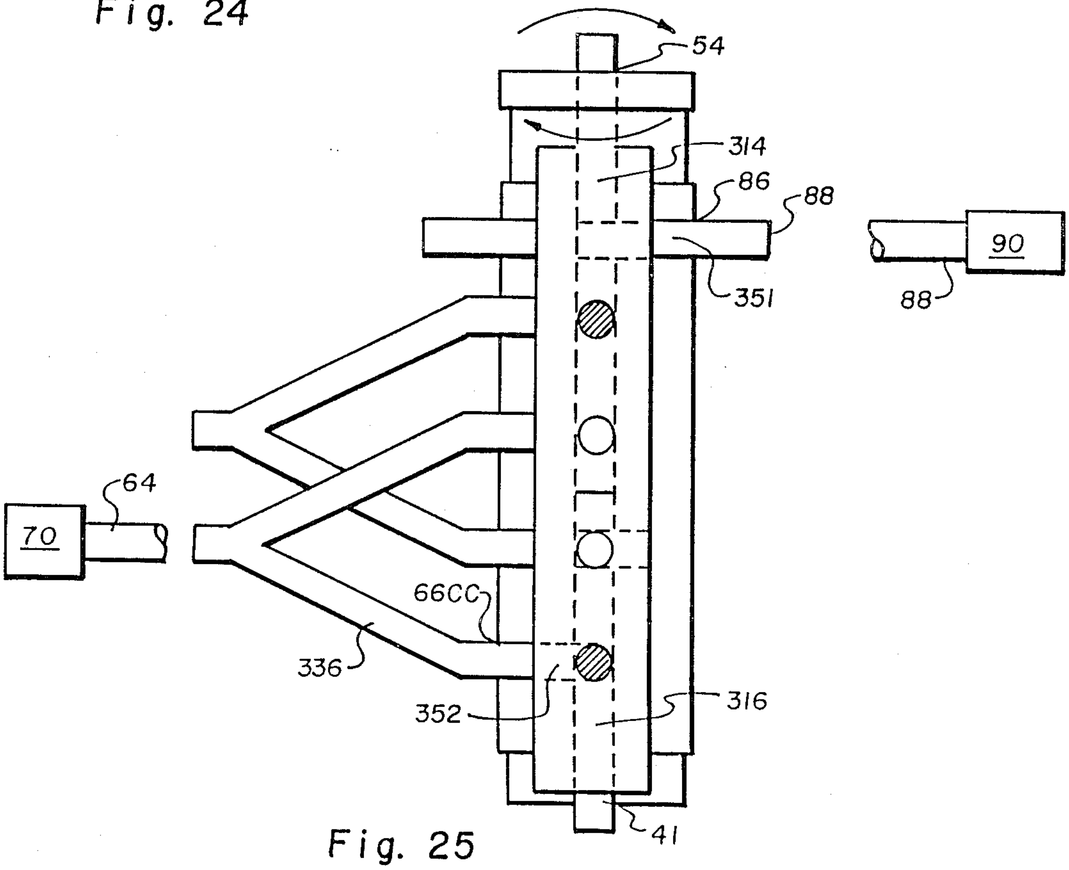
FIG. 25 is a side cross-sectional view of the third embodiment of the instant invention shown in a fourth orientation, i.e., a transfer-through mode.

The "transfer through" orientation of the valve 300 is illustrated in FIG. 25. This fourth mode of operation provides for fuel to be drawn from a first exterior source 70 and thereafter be directed, by means of the operation of the accessory fitted vehicle, through that accessory fitted vehicle and to be discharged into second exterior fuel system. This mode of operation corresponds to that which is illustrated in FIG. 4 of the schematic drawings.

A conduit 336 is adapted to receive fuel from external source 70 by means of a conduit 64C. Fuel from the conduit 336 is directed through the port 66CC and thereafter discharged into the channel 352 defined by the core 312. The fuel within channel 352 is thereafter directed through the channel 316. Fuel within channel 316 is directed downwardly through port 41 into conduit 42 which subsequently directs the fuel to the pump 38. That portion of the fuel not consumed, i.e., not utilized by the carburetor, is exhausted through conduit 48 attached thereto and is returned to the valve 32C through port 54. Port 54 communicates with the interior channel 314, which communicates with a channel 351. Channel 351 extends outwardly from the longitudinal axis 318 of the valve core 312 to communicate with the surface of the valve core 312. Channel 351 is positionable to communicate with port 86C. Fuel within conduit 351 is directed outwardly through port 86 of the valve casing 300 and is thereafter discharged into an exterior conduit 88. Conduit 88 directs the fuel to a second exterior fuel source 90.

Figure 26:
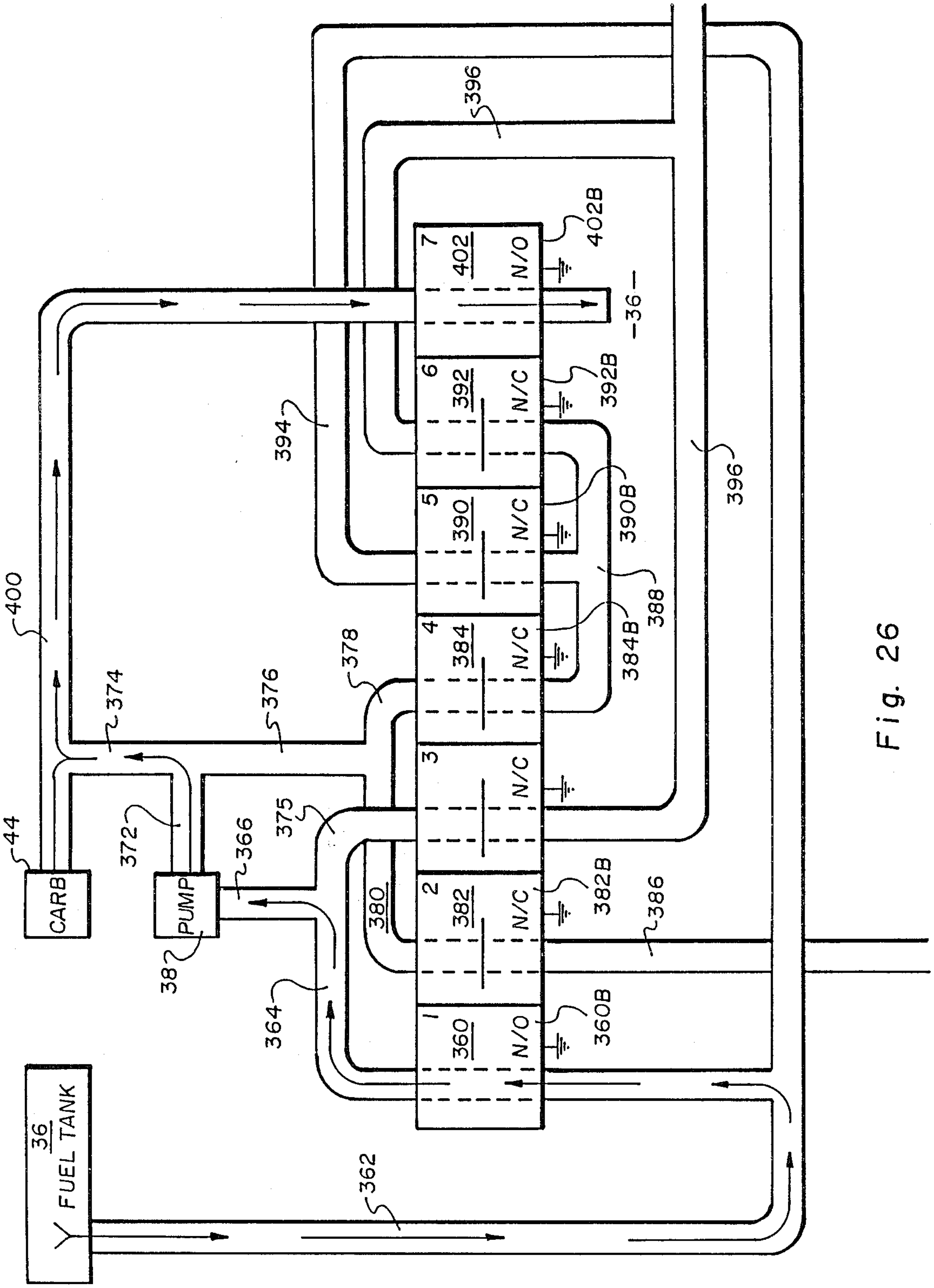
FIG. 26 is a schematic view of a fourth embodiment of the instant invention having a plurality of remotely activated valves. As shown, the valve system is in a first or normal orientation.
Figure 27:
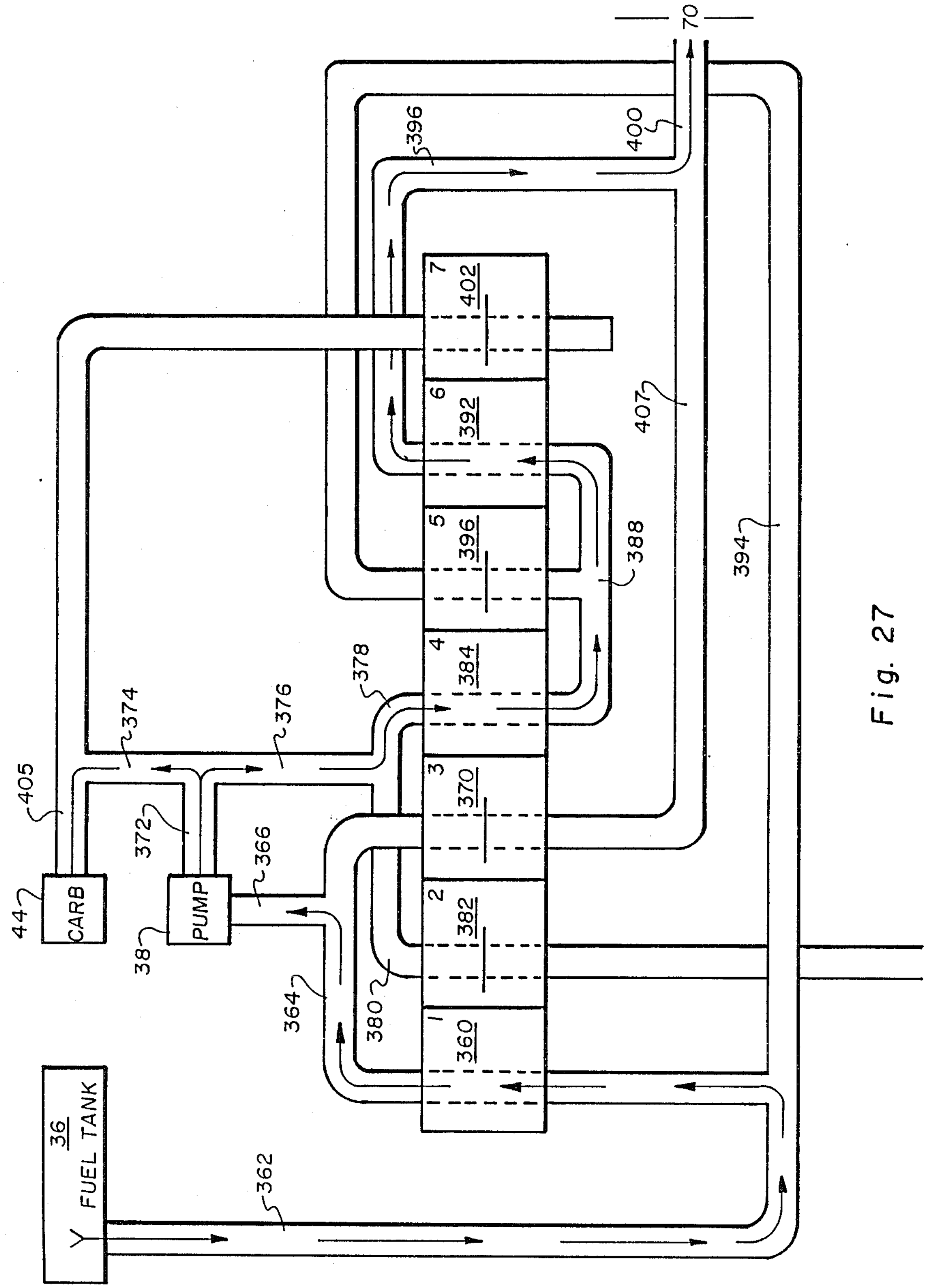
FIG. 27 is a schematic view of a fourth embodiment of the instant invention shown in a second orientation or condition.

Illustrated in FIGS. 26 though 29 is a fourth embodiment of the instant invention wherein the operation of the valve system is controlled from a locale remote from the valve itself. As shown, this system includes the basic components of the former systems, i.e., a fuel tank, a fuel pump, a carburetor, and an assorted collection of valving in association with connecting conduit.

In FIG. 26, a valve system is shown in a normal operating mode, i.e., a mode in which fuel is directed from the fuel tank through the pump and past the carburetor of the accessory fitted vehicle. All fuel not utilized by the carburetor is thereafter directed to the fuel tank of the vehicle. As shown, a fuel tank 36 communicates with a first valve 360 by means of a conduit which connects fuel tank 36 and valve 32D. This conduit is generally designated as 362. The valve 360 is controlled by a electrified solenoid mechanism which in its normal equilibrium position is held open. The valve 360 is fitted with a conduit 364 which extends outwardly therefrom and is connected by conduit 366 to a pump 38 and by another conduit 368 to a second valve designated generally 370. Valve 370 is controlled by a solenoid 370A which in its normal equilibrium position is held in a closed orientation.

Pump 38 is fitted with a conduit generally 372 which extends outwardly therefrom. Conduit 372 is connected to a pair of branching conduits designated generally 374 and 376. More specifically, conduit 376 is connected through a Y-shaped joint to two conduit branches, 378 and 380. Branch 380 is connected to a third valve designated generally 382 which is controlled by a solenoid 382A which in its normal de-energized condition or equilibrium position, is closed. Conduit 378 is connected to a fourth conduit 384 which is controlled by a solenoid 384A. This solenoid, in its equilibrium position, is held in a closed orientation.

Valve 382 includes a conduit, designated generally 346, which extends outwardly therefrom. Valve 384 includes a conduit 388 which extends outwardly therefrom and communicates with a fifth valve 390. Valve 390 is controlled by a solenoid 350A which, in its equilibrium position, is held in a closed orientation. Conduit 388 also communicates with a sixth valve 392 which is controlled by a solenoid 352A. Solenoid 352A, in its equilibrium position, is held in a closed orientation. Valve 390 is connected to a conduit 394 which communicates with the conduit 362 and is directly connected to the fuel tank 36.

Valve 370 and valve 392 are connected to a common conduit 396.

Conduit 374 is connected to a conduit 360 which in turn communicates with carburetor 44. Conduit 374 connects with a seventh valve 402 which is controlled by a solenoid 402A which, in its equilibrium position, is held in an open orientation.

As shown in FIG. 26, when the valve system is held in its normal orientation, all of the valves solenoids are de-energized. Resultingly, a fuel passageway is established from the fuel tank 36 through conduit 362 upward through the open valve 360 into the conduit 364. Since valve 370 is closed, the fuel in conduit 364 is forced into conduit 366, and thereafter into pump 38. The pump directs the fuel through conduit 372. Since valves 382 and 384 are closed, the fuel in conduit 372 is directed into conduit 384 and subsequently into carburetor 44. All excess fuel supplied to the carburetor 44 is directed outwardly through conduit 400 into valve 402. Valve 402, being in an open orientation, directs the fuel outward through a conduit 404 which is connected to a fuel tank 36. It will be understood, therefore, that the system flow pattern provided by the valve system as shown in the FIG. 25 orientation provides the flow pattern as described schematically in FIG. 1.

Figure 28:
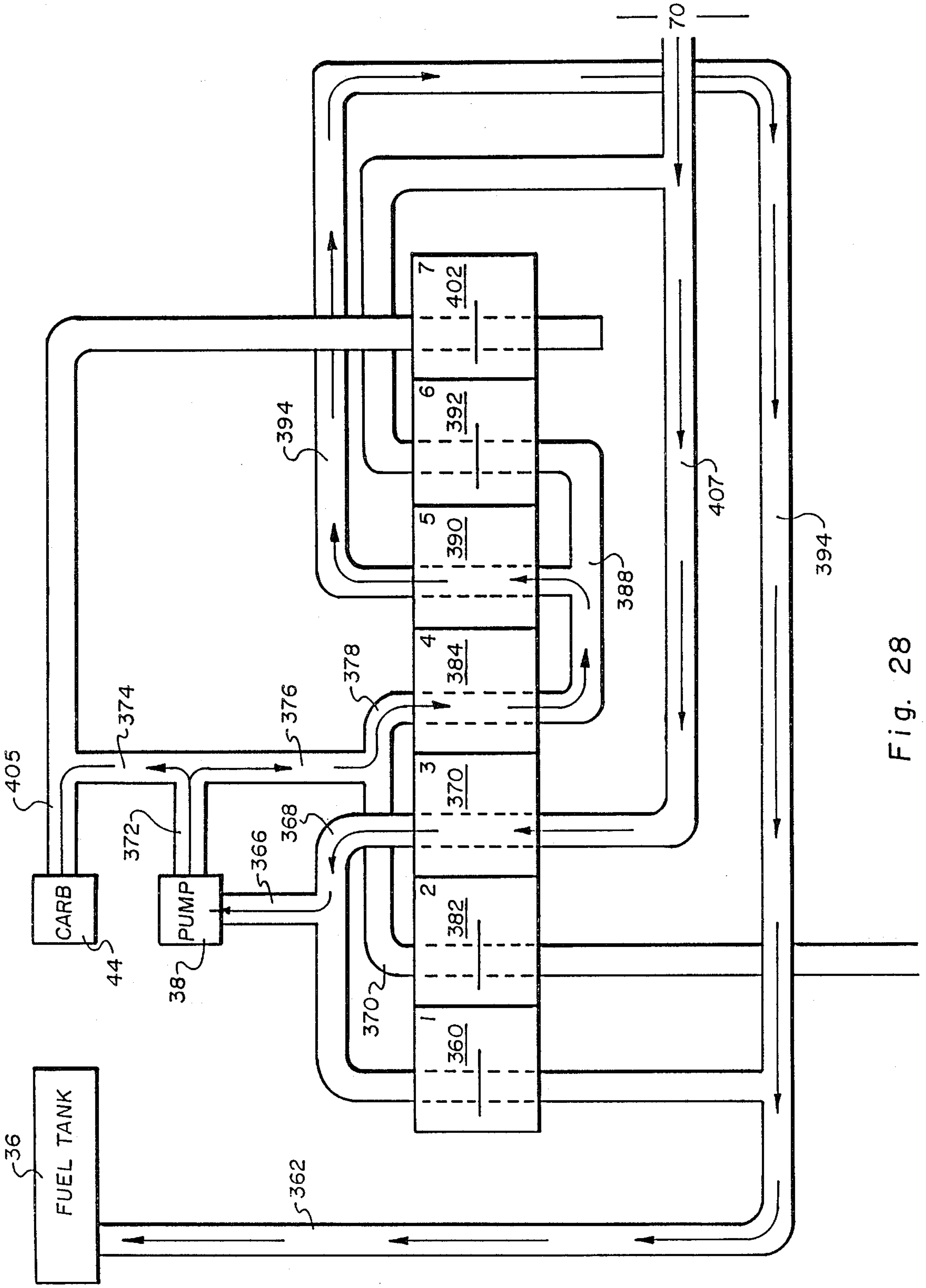
FIG. 28 is a schematic view of the fourth embodiment of the invention shown in a third orientation.

The orientation of the automated valve system as shown in FIG. 28 corresponds to the flow pattern shown schematically in FIG. 2. In this orientation, valves 360, 370, 374 and 402 are energized. As shown, fuel is received from an exterior source 70 through conduit 406. Since valve 370 has been energized in this system the valve is open, thereby permitting the passage of fuel through the valve 370 into conduit 368. Valve 360 also having being energized, is in a closed orientation, which directs the fuel in conduit 368 to flow into conduit 366 and thereafter into pump 38.

The pump 38 forces the fuel into conduit 372. As the fuel flows outwardly from the conduit 372 it flows both into conduit 374 as well as into conduit 376. Since valve 402 has been closed by the activation of solenoid 402A the fuel channeled into conduit 374 is directed solely to the carburetor 44. The fuel which enters conduit 376 is forced through the opened, i.e., activated valve 374, through conduit 378. Any flow through conduit 380 is precluded since valve 382 is maintained in its closed position. The flow therefore passes through valve 384 and is directed into conduit 388. Being that valve 392 is in its closed orientation, i.e., non-energized, the fuel is channeled through valve 390 and subsequently into conduit 394. The fuel which is in conduit 394 is directed along the length of that channel, eventually emptying into conduit 362 which directs the fuel to return to fuel tank 36.

It may be noted, therefore, that the energized system as shown in FIG. 28 provides a means for receipt of fuel from an exterior fuel source and the directing of that fuel through the pump and to the carburetor of the accessory fitted vehicle as well as providing a supply of fuel to the fuel tank of that vehicle.

The orientation of the fourth embodiemnt valve system, as shown in FIG. 26, illustrates an orientation wherein fuel may be taken from the fuel tank of the accessory fitted vehicle to supply not only the operation of the engine of that vehicle but furthermore, provide a supply of fuel to an external fuel system.

As shown, fuel is taken from fuel tank 36 through conduit 362 and directed through valve 360 which, in its de-energized position, is open. The fuel is precluded from flowing through conduit 394 by the de-energized, i.e., closed, position of valve 390. Fuel having passed through valve 360 is directed into conduit 364.

Since valve 370 is in an de-energized, i.e., closed, orientation the fuel in conduit 364 is directed through conduit 366 to pump 38. The pump directs the fuel into channel 372. Fuel discharged from conduit 372 enters both conduits 334 as well as 376. Since valve 402 is in its closed orientation, i.e., de-energized orientation, the fuel within conduit 374 must flow through conduit 405 into carburetor 44 and supply the operation of the vehicle. The excess fuel which is received within conduit 376 is directed through conduit 378. This flow of fuel through conduit 378 is required since valve 382 is in a de-energized or closed condition, which precludes the flow of fuel through conduit 380. The fuel from conduit 378 is channeled through valve 384 which is in an energized, i.e., opened, orientation. The fuel is then discharged from valve 384 through conduit 388.

Being that valve 390 is in a closed orientation, the fuel within conduit 388 is therefore channeled through valve 392 which is in an open orientation, i.e., an energized condition. The fuel is passed through valve 392 into conduit 396. From conduit 396 the fuel is directed outwardly through conduit 400. The fuel is precluded from entering that leg of conduit 396, identified generally as 407, since the valve 370, positioned on the end of that conduit, is in a de-energized, i.e., in a closed, orientation. Fuel in conduit 400 is directed outwardly to an exterior fuel source 70 and is therefore discharged into the external fuel system 70.

Figure 29:
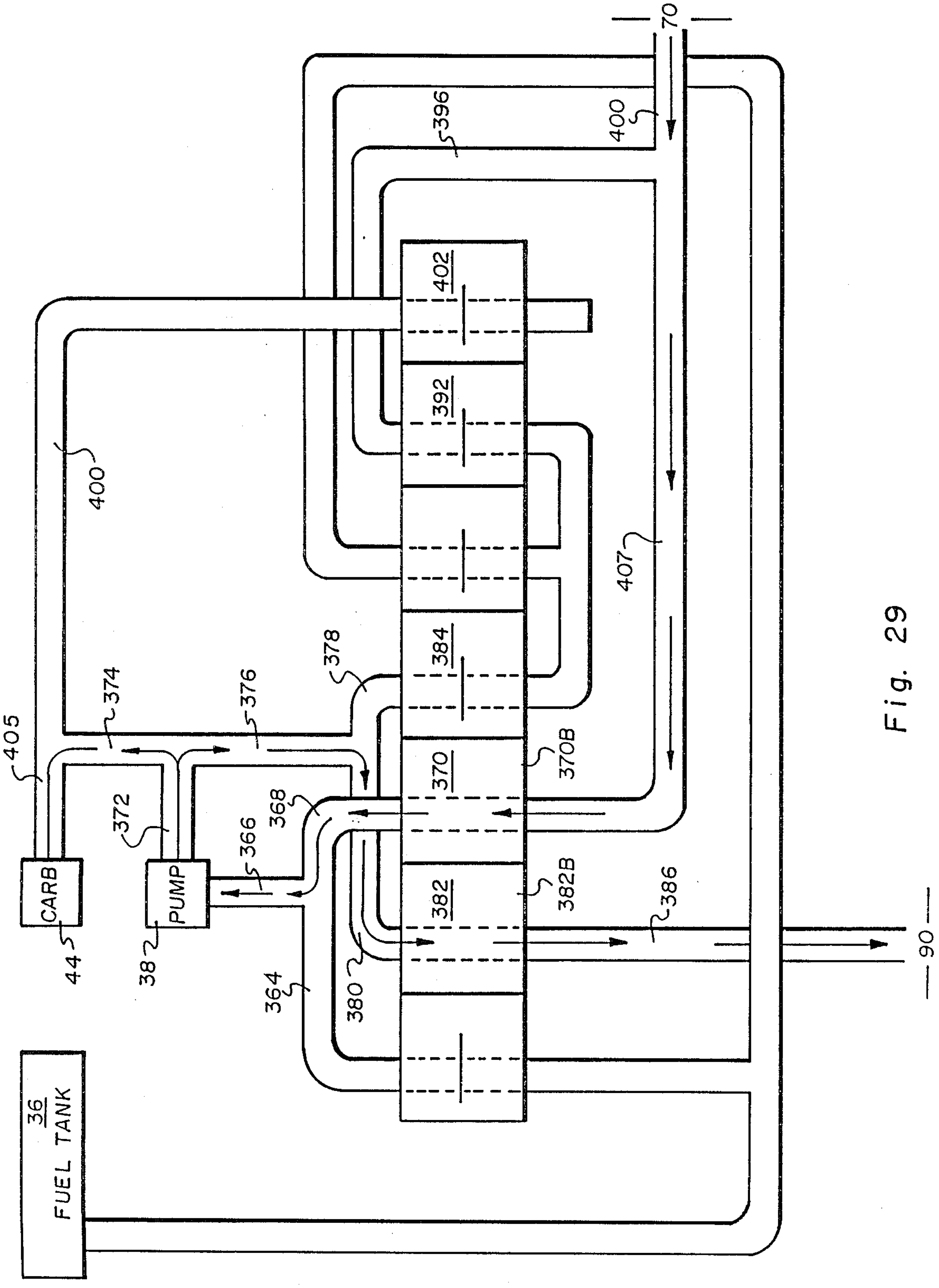
FIG. 29 is a schematic view of the fourth embodiment of the instant invention as detailed in FIGS. 23 through 25 shown in a fourth or transfer-through-mode orientation or condition.

The orientation of the fourth embodiment of the invention as shown to advantage in FIG. 29 illustrates the flow pattern which is schematically illustrated in FIG. 4. The orientation includes means of receiving fuel from an exterior fuel source 70, transferring that fluid through the pump 38 and past the carburetor 44 of the accessory fitted vehicle, and thereafter channeling a supply of fuel to a second external fuel system. In this orientation valves 360, 382, 370, 392 and 402 are energized.

Fuel is received from an external source 70 through conduit 400. Since valve 392 is in a de-energized, i.e., closed, orientation fuel received within 400 does not flow through the conduit 396. Instead, the fuel is directed through conduit 407 through valve 370 which is in an energized, i.e., opened, orientation. The fuel is thereafter transferred through conduit 368 and is received within conduit 346 from conduit 348. In this orientation the valve 360 is in an energized, i.e., closed, orientation. This precludes the flow of fuel through conduit 364. From conduit 366 fuel is received within pump 38 and thereafter transferred through conduit 372 into conduits 374 and 376. The fuel entering conduit 374 is thereafter transferred through conduit 405 into the carburetor 44. Fuel does not flow through the conduit 400 since valve 402 is in an energized, i.e., closed, orientation.

The excess fuel received within conduit 376 is thereafter channeled through 380. The flow from 376 does not continue through conduit 378 since valve 388 is in a de-energized condition, i.e. closed orientation. Valve 382 therefore receives the flow from conduit 380. The valve 382 is an energized condition, i.e. open, permitting flow of fuel through that valve and into the conduit 386. Conduit 386 is connected with an external fuel system 90.

It may be recognized that the orientation shown in FIG. 28 provides a means whereby fuel may be received from the external source 70, transferred through the fuel pump and carburetor to maintain the operation of an accessory fitted vehicle, while at the same time a quantity of fuel is supplied to a second external fuel system 90.

Those skilled in the art will recognize that the embodiments hereinbefore discussed are illustrative of the general principles of the invention. The embodiments herein described are not intended to limit the scope of the claims which themselves recite what applicant regards as his invention.

I claim:

1. A multi-use valve system adapted for placement in the fuel supply system of a first vehicle's engine, said valve system comprising:

a valve body;

a valve core adjustably associated with said valve body;

a first conduit mounted in said valve body to communicate with said valve core, said first conduit being associated with a fuel tank of said first vehicle;

said first conduit being adapted for conveying fuel between said valve core and said first vehicle's fuel tank;

a second conduit mounted in said valve body to communicate with said valve core, said second conduit being associated with a carburetor of said first vehicle; said second conduit being adapted for conveying fuel between said valve core and said carburetor;

a third conduit mounted in said valve body to communicate with said valve core, said third conduit being associable with a second fuel system tank, said third conduit being adapted for for conveying fuel between said valve core and said second fuel system;

a fourth conduit mounted in said valve body to communicate with said valve core, said fourth conduit being associated with a fuel pump of said first vehicle, said fourth conduit being adapted for conveying fuel between said valve core and said fuel pump;

wherein said valve core includes a plurality of channels adjustable between two distinct conditions, a first condition wherein said core channels interconnect said first conduit with said fourth conduit, whereby fuel is received from said first vehicle's fuel tank, passed through said fuel pump and carburetor; and a second condition wherein said core channels interconnect said third conduit to said fourth conduit, and said second conduit to said first conduit whereby fuel is received from a second vehicle's fuel system, passed from said fuel pump to said carburetor and any excess fuel is directed to said first vehicle's fuel tank.

2. The valve system according to claim 1 wherein said valve core is adjustable to a third condition wherein said core channels connect said first conduit to said fourth conduit, and said second conduit to said third conduit whereby fuel may be received from said first vehicle's fuel tank, passed through said said fuel pump, into said carburetor and in part directed to said second fuel system.

3. The valve system according to claim 1 further including a fifth conduit mounted in said valve body to communicate with said valve core, said fifth conduit being associated with a third fuel system whereby said fifth conduit is adapted for conveying fuel between said valve core and said third fuel system wherein said valve core is adjustable to a fourth condition wherein said core channels interconnect said third conduit to said fourth conduit and said second conduit to said fifth conduit whereby fuel may be received from said second fuel system, passed through said fuel pump and carburetor and any excess fuel is directed to said third fuel system.

* * * * *